(12) United States Patent
Takatori

(10) Patent No.: US 7,120,329 B2
(45) Date of Patent: Oct. 10, 2006

(54) OPTICAL CROSSCONNECT DEVICE AND MONITORING METHOD OF OPTICAL CROSSCONNECT DEVICE

(75) Inventor: Kou Takatori, Yokohama (JP)

(73) Assignee: Fujitsu Limited, Kanagawa (JP)

( * ) Notice: Subject to any disclaimer, the term of this patent is extended or adjusted under 35 U.S.C. 154(b) by 69 days.

(21) Appl. No.: 10/726,711

(22) Filed: Dec. 4, 2003

(65) Prior Publication Data

US 2004/0146239 A1 Jul. 29, 2004

(30) Foreign Application Priority Data

Dec. 24, 2002 (JP) .............................. 2002-372255

(51) Int. Cl.
*G02B 6/26* (2006.01)
*G02B 6/28* (2006.01)

(52) U.S. Cl. .......................................... 385/17; 385/24
(58) Field of Classification Search ................. 385/17, 385/24
See application file for complete search history.

(56) References Cited

U.S. PATENT DOCUMENTS 6,898,341 B1 * 5/2005 Huang et al. .................. 385/18

FOREIGN PATENT DOCUMENTS

| JP | 11-27298 | 5/1989 |
|----|----------|--------|
| JP | 2000-312046 | 11/2000 |

* cited by examiner

*Primary Examiner*—Frank G. Font
*Assistant Examiner*—Michael P. Mooney
(74) *Attorney, Agent, or Firm*—Bingham McCutchen LLP

(57) ABSTRACT

An optical crossconect device comprises an optical switch, input optical level monitoring unit for monitoring optical levels of optical signals supplied to there to, signal generating unit for generating a monitoring signal to monitor the optical switch, input optical signal selecting unit for selecting the monitoring signal generated by the monitoring signal generating unit provided between the optical transmission signal input unit and the optical switch and for supplying the selected optical signal to the optical switch, and input optical signal controlling unit for controlling the input optical signal selecting unit based on an output of the input optical level monitoring unit.

7 Claims, 22 Drawing Sheets

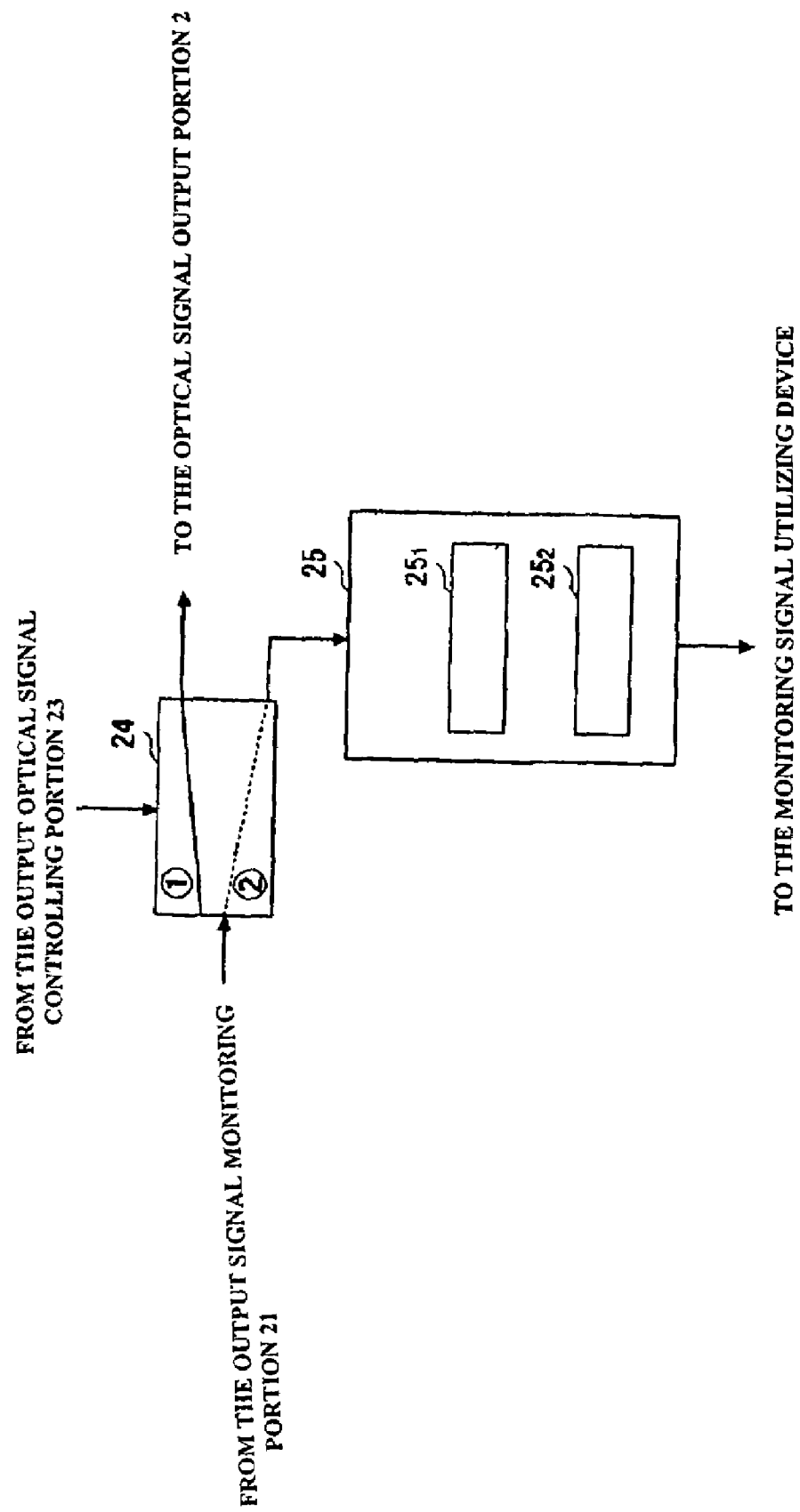

OPTICAL CROSSCONNECT DEVICE AND MONITORING METHOD OF OPTICAL CROSSCONNECT DEVICE

BACKGROUND OF THE INVENTION

1. Field of the Invention

The present invention relates to an optical crossconect device and a monitoring method of optical crossconnect device and particularly to an optical crossconnect device assuring higher reliability and stability of man optical switch circuit and a monitoring method of an optical crossconnect device.

2. Related Art

With rapid progress of the Internet, capacity of the backborn network is more and more increasing. Recently, an optical crossconnect device has been developed for realizing dynamic path setting and cancellation thereof in unit of the large capacity optical path depending on change of traffics.

This optical crossconnect device can realize the switching operation without conversion of the transmitted optical signal into an electrical signal and therefore can realize reduction in size of the device even when a large capacity traffic is accommodated. However, since the optical crossconnect device accommodates traffics of large capacity, a failure of the optical crossconnect device will give large influence to users utilizing the optical crossconnect device.

Therefore, it is essential to enhance the stability and reliability of the device. For example, the patent document 1 discloses the technology to control the operations of an optical amplifier with a control means comprised within the relevant optical amplifier based on the receiving intensity of the reference optical signal.

However, the invention described in the patent document 1 has a problem that the function does not become effective if the reference optical signal is not received. Therefore, as disclosed in the patent document 2, the technology is known to transmit an optical signal for monitoring to the transmission link even when the optical signal of the particular wavelength of the optical transmission line is not transmitted.

The optical crossconnect device described in the patent document 2 is illustrated in FIG. 1. The optical crossconnect device 10 of FIG. 1 is provided with an optical transmission signal input portion 12, an optical switch circuit 11, an optical transmission signal output portion 13, an optical signal inserting means 15 and an optical signal monitoring means 14. An optical signal for monitoring is transmitted by the optical signal inserting means 15 to the optical transmission line of a switching destination or to a switch-back destination and the optical signal for monitoring is monitored in the optical signal monitoring means 14 within the optical crossconnect device installed at one end of the optical transmission line.

Accordingly, when the transmission line is switched because a failure occurs in the optical crossconnect device or when the transmission line is switched back because the failure is recovered, normal condition and recovery of the optical transmission line where the optical transmission signal of the switching destination or the switch-back destination does not flow and the path in the optical crossconnect device can be monitored and verified.

The Patent Document 1 is a Japanese Published Unexamined Patent Application 2000-312046.

The Patent Document 2 is a Japanese Published Unexamined Patent Application 11-27298.

However, the invention described in the patent document 2 can verify the normal condition of the optical transmission line and the path in the output side of the optical crossconnect device but cannot verify the normal condition of the optical switch circuit forming the optical crossconnect device. Moreover, the switching condition cannot be optimized by this patent document.

Therefore, it is thought, to optimize the switching condition of the optical switch circuit as the core of the optical crossconnect device, that the switching condition of the optical switch circuit is optimized by comparing optical intensity of an input optical signal and an output signal of the optical switch circuit forming the optical crossconnect device in view of improving stability and reliability of the switching condition.

Even in this case, however, an optical signal must always be inputted to the optical switch circuit in order to optimize the internal switching condition by comparing an optical intensity of the input optical signal of the optical switch circuit with that of the output optical signal. However, when the optical signal inputted from the external side disappears, the optimizing operation is stopped. As a result, here rises a problem that verification of normal operation of the optical switch becomes difficult and the stable output cannot be assured when the optical signal is inputted again.

Moreover, when the normal operation is verified by comparing optical intensity of the input optical signal and output optical signal of the optical switch circuit, it is difficult, unlike the signal of electrical level, to verify normal condition only by setting the path in the device. Therefore, it cannot be verify before start of the operation by user that optical switch circuit in relation to the relevant user is surely functioned and therefore failure of the device can be determined after the optical signal of user is actually inputted. For this reason, the failure can be detected initially in some cases after the user signal starts the operation, resulting in the problem that reliability is rather low.

SUMMARY OF THE INVENTION

The present invention has been proposed considering the problems described above and it is therefore an object of the present invention to provide an optical crossconnect device of higher stability and reliability which can always verify the operations of an optical switch forming the optical crossconnect device and a monitoring method of the optical crossconnect device.

In order to overcome the problems described above, the present invention introduces following means to solve the problems characterized as described below.

The optical crossconnect device according to the invention comprising an optical switch circuit, wherein if an optical level of optical signal in unit of wavelength, wavelength group or optical fiber supplied to an optical transmission signal input portion of the relevant optical crossconnect device is the predetermined level or less, a monitoring signal for monitoring the optical switch is supplied to the optical switch circuit in unit of wavelength, wavelength group or optical fiber.

The optical crossconnect device according to the invention further comprises an optical level of the optical signal in unit of wavelength, wavelength group, or optical fiber supplied to the optical transmission signal input portion of the optical crossconnect device is the predetermined level or less, the optical signal can always be supplied to the optical switch circuit without relation to the optical signal input condition from the external side by supplying a monitoring signal for monitoring the optical switch circuit to the optical switch circuit in unit of wavelength, wavelength group or optical fiber.

The optical crossconnect device according to the invention further comprising an optical switch, including an input optical level monitoring means for monitoring an optical level of the optical signal supplied to the optical transmission signal input portion of the relevant optical crossconnect device, a monitoring signal generating means for generating a monitoring, signal to monitor the optical switch circuit, an input optical signal selecting means provided between the optical transmission signal input portion and the optical switch circuit to supply the selected optical signal to the optical switch circuit by selecting the monitoring signal generated by the monitoring signal generating means or the optical signal supplied to the optical transmission signal input portion, and an input optical signal controlling means for controlling the input optical signal selecting means based on an output of the input optical level monitoring means.

The optical crossconnect device according to the invention further comprising an input optical level monitoring means for monitoring an optical level of the optical signal supplied to the optical transmission signal input portion, a monitoring signal generating means for generating the monitoring signal to monitor the optical switch circuit and an input optical signal selecting means which is provided between the optical transmission signal input portion and the optical switch circuit to supply the selected optical signal to the optical switch circuit by selecting the monitoring signal generated by the monitoring signal generating means or optical signal supplied to the optical transmission signal input portion are included, and when the input optical signal does not exist (or the input optical signal is small), the monitoring signal generated by the monitoring signal generating means is supplied to the optical switch circuit by controlling the input optical signal selecting means and thereby the optical signal can always be supplied to the optical switch circuit without relation to the optical signal input condition from the external side and thereby the monitoring signal can be effectively supplied in this case to the optical switch circuit.

The optical crossconnect device according to the invention further comprises an optical switch circuit for switching in unit of wavelength group, including a multiplexing means to obtain an optical signal of waveform group by multiplexing optical signals in unit of wavelength, and a monitoring signal generating means for generating a monitoring signal for monitoring the optical switch circuit and having the wavelength different from the wavelength of the input optical signal supplied to the optical transmission signal input portion of the relevant optical crossconnect device, wherein the multiplexing means multiplexes an optical signal of the monitoring signal generated by the monitoring signal generating means and an optical signal in unit of wavelength supplied to the optical transmission signal input portion and then supplies the multiplexed optical signal of wavelength group to the optical switch.

The optical crossconnect device according to the invention wherein the multiplexing means for multiplexing optical signals in unit of wavelength to output optical signal in unit of waveform group and the monitoring signal generating means for generating the monitoring signal for monitoring the optical switch circuit of the waveform different from that of the input optical signal supplied to the optical transmission signal input portion of the relevant optical crossconnect device are comprised, and since the multiplexing means is always capable of supplying the optical signal to the optical switch circuit without relation to the optical signal input condition from the external side by multiplexing the optical signal of the monitoring signal generated by the monitoring signal generating means and the optical signals in unit of wavelength supplied to the optical transmission signal input portion and then supplying the multiplexed optical signal of wavelength group to the optical switch circuit, the normal condition of the optical switch can always be monitored and optimized operation of the optical switch can always be performed and thereby stability and reliability of the optical switch can be improved.

Moreover, since the optical signal can always be supplied to the optical switch circuit by multiplexing the monitoring signal of the wavelength different from that of the external input optical signal to the external input optical signal, input switching process of the external input optical signal and the monitoring signal is no longer required.

The optical crossconnect device according to the invention further comprises an optical switch for switching in unit of wavelength group, including a multiplexing means for obtaining an optical signal of wavelength group by multiplexing optical signals in unit of wavelength, a monitoring signal generating means for generating an optical signal of the wavelength group by multiplexing optical signals in unit of wavelength of the same wavelength as the wavelength of the input optical signal supplied to the optical transmission signal input portion of the relevant optical crossconnect device, an input optical level monitoring means for monitoring optical level of the input optical signal of the same wavelength as the wavelength of the monitoring signal supplied to the optical transmission signal input portion, and a monitoring signal controlling means for controlling the monitoring signal generating means based on an output of the input optical level monitoring means, wherein the multiplexing means multiplexes an optical signal of the monitoring signal generated by the monitoring signal generating means and an optical signal in unit of wavelength supplied to the optical transmission signal input portion and then supplies the multiplexed optical signal of wavelength group to the optical switch circuit.

The optical crossconnect device according to the invention wherein the optical crossconnect device including the optical switch circuit for switching in unit of wavelength group comprises the multiplexing means for multiplexing the optical signals in unit of wavelength to output an optical signals of the wavelength group, the monitoring signal generating means for generating the monitoring signal to monitor the optical switch circuit in the wavelength same as that of the input optical signal supplied to the optical transmission signal input portion of the relevant optical crossconnect device, the input optical level monitoring means for monitoring the optical level of the input optical signal of the wavelength same as the wavelength $\lambda n$ of the monitoring signal supplied to the optical transmission signal input portion and the monitoring signal controlling means for controlling the monitoring signal generating means based on an output of the input optical level monitoring means, wherein the multiplexing means is always capable of supplying the optical signal of wavelength $\lambda n$ to the optical switch circuit and thereby realizing the optimized operation of the optical switch circuit by multiplexing the optical signal of the monitoring signal generated by the monitoring signal generating means to the optical signal in unit of wavelength supplied to the optical transmission signal input portion and then supplying the multiplexed optical signal of wavelength group to the optical switch circuit.

Moreover, since it is no longer required to reserve the wavelength for the monitoring signal in addition to the wavelength of the optical transmission signal in the multiplexer and demultiplexer, the wavelengths which may be processed in the multiplexer and demultiplexer can completely be assigned to the optical transmission signals.

A monitoring method of optical crossconnect device including an optical switch circuit according to the invention, wherein if an optical level of the optical signal in unit of wavelength, wavelength group or optical fiber supplied to an optical transmission signal input portion of the relevant optical crossconnect device is the predetermined level or less, the monitoring signal for monitoring the optical switch circuit is supplied to the optical switch circuit in unit of wavelength, wavelength group or optical fiber.

According to the invention, it is possible to provide the highly stable and reliable monitoring method of the optical crossconnect device which is always capable of realizing the verification of operations of the optical switch forming the optical crossconnect device by supplying the monitoring signal for monitoring the optical switch circuit to this optical switch circuit in unit of wavelength, wavelength group or optical fiber when the optical level of the optical signal in unit of wavelength, wavelength group or optical fiber supplied to the optical transmission signal input portion of the relevant optical crossconnect device is the predetermined level or less.

BRIEF DESCRIPTION OF DRAWINGS

FIG. 22 is a diagram for describing an example of structure of an output destination selecting portion and a monitoring signal processing portion.

DESCRIPTION OF THE PREFERRED EMBODIMENT

The present invention relates to a device comprising a means for inserting a monitoring signal to realize verification of the normal function of the optical switch and the optimized operation thereof. Moreover, the present invention relates to a device to monitor an input optical signal from the external side and to automatically switch, if a failure is detected, this input signal to a monitoring signal or to always multiplex the monitoring signal beam to the input optical signal.

Accordingly, since the optical signal can always be inserted to the optical switch without relation to the optical signal input condition from the external side, normal condition of the optical switch can always be monitored and the optimized operation thereof can always be performed. As a result, stability and reliability of the optical switch can be improved.

In addition, potential failure of optical switch can be prevented in the optical crossconnect device by implementing the connection control between non-used input port and non-used output port of the optical switch.

Figure 1:
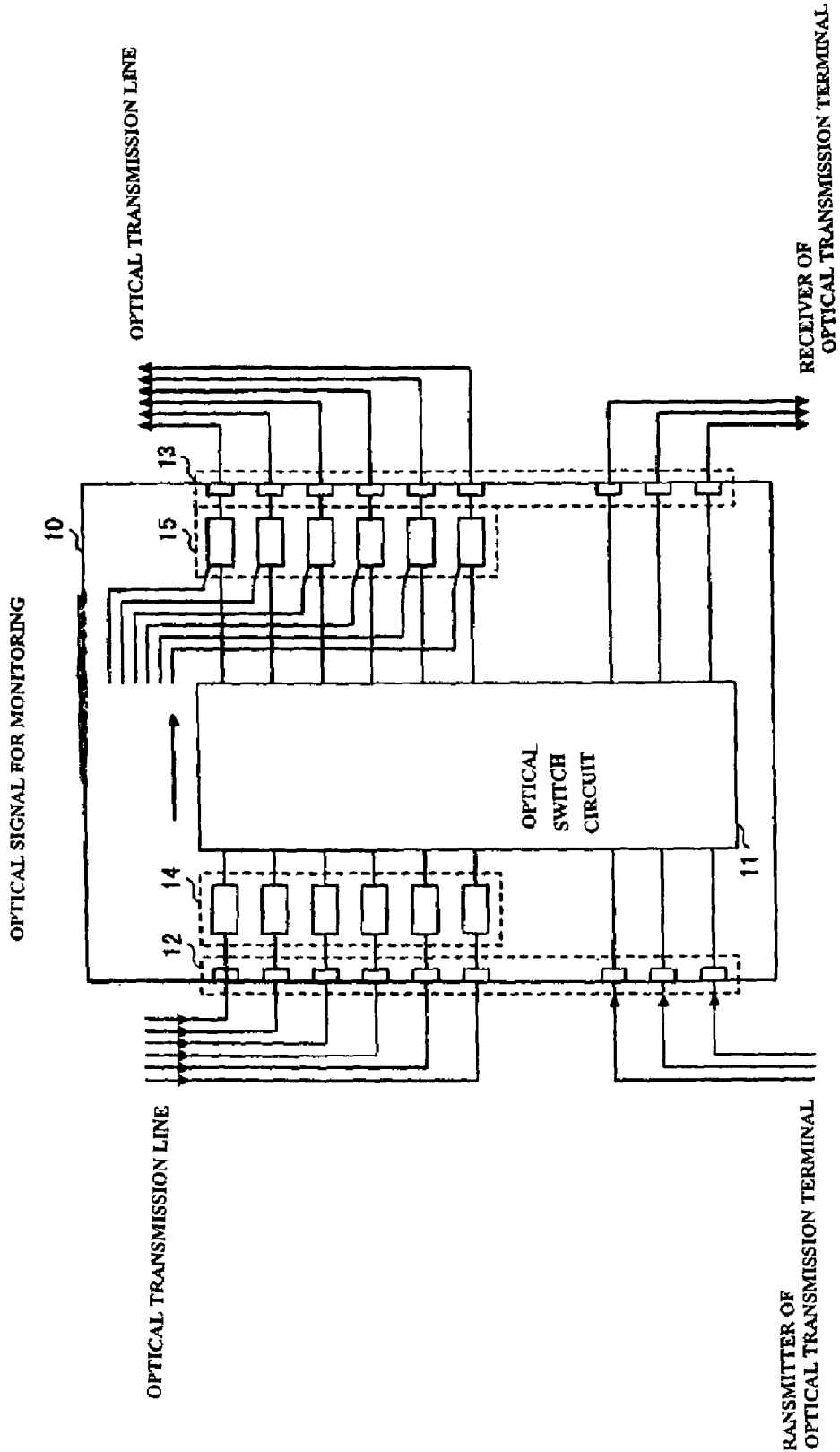
FIG. 1 is a diagram for describing the prior art.
Figure 2:
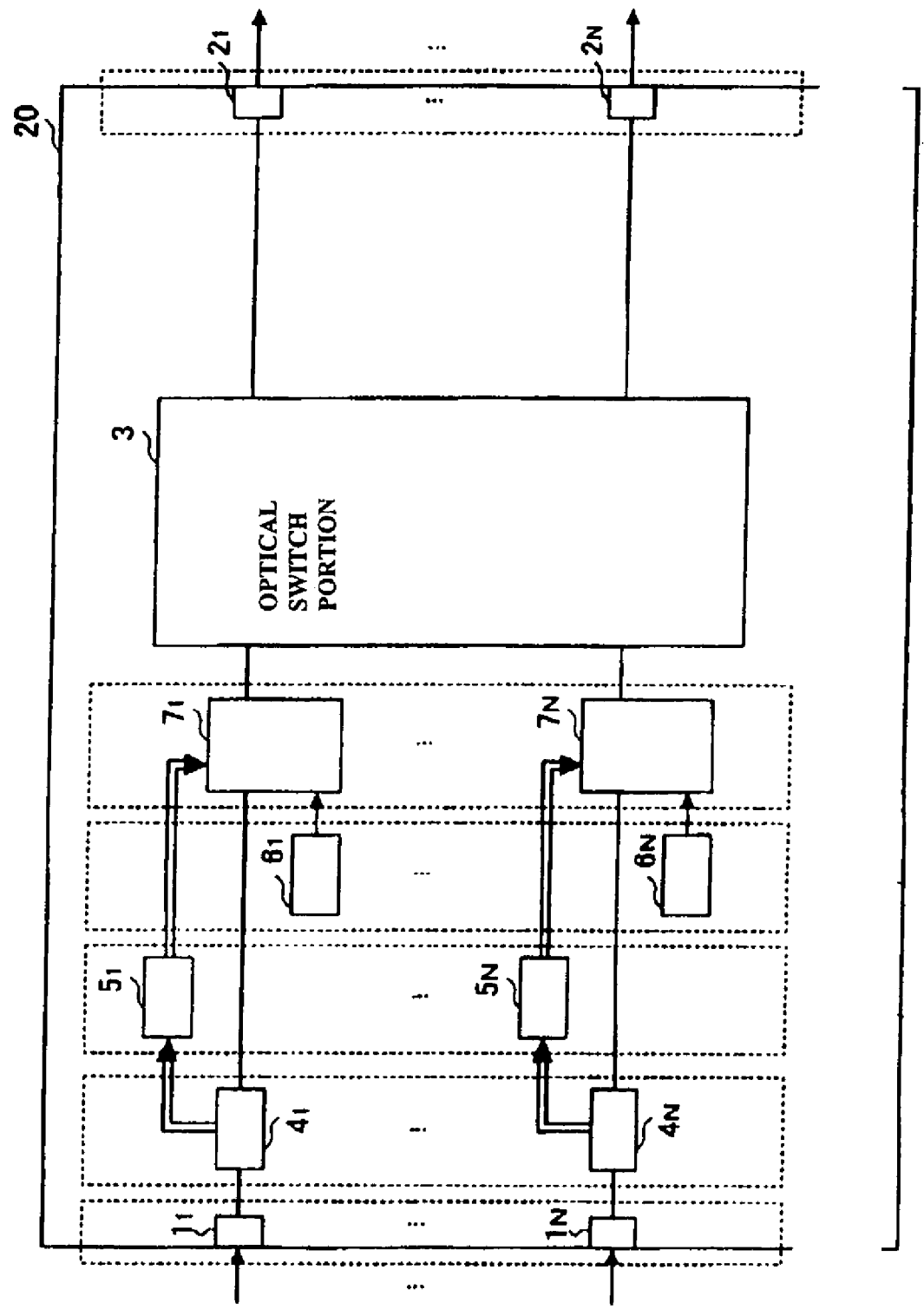
FIG. 2 is a diagram for describing an example of structure of the optical crossconnect device of the first embodiment.

Next, the embodiments of the present invention will be described with reference to the accompanying drawings. FIG. 2 illustrates an example of structure of an optical crossconnect device of the first embodiment.

The optical crossconnect device of FIG. 2 comprises optical transmission signal input portions $1_1$ to $1_N$, optical transmission signal output portions $2_1$ to $2_N$, an optical switch portion 3, input signal monitoring portions $4_1$ to $4_N$, input optical signal control portions $5_1$ to $5_N$, monitoring signal generating portions $6_1$ to $6_N$, and input optical signal selecting portions $7_1$ to $7_N$.

Optical signals inputted to the optical transmission signal input portions $1_1$ to $1_N$ of the optical crossconnect device 20 are switched by the optical switch portion 3 and are then outputted from the predetermined optical transmission signal output portions $2_1$ to $2_N$. The optical signals in unit of wavelength, wavelength group or optical fiber are impressed to the optical transmission signal input portions $1_1$ to $1_N$, and the switching is performed in the optical switch portion 3 in unit of wavelength, wavelength group or optical fiber.

Here, as the optical switch portion 3, a mirror type, bubble type, flat surface optical waveguide type or mechanical type switch (MEMS, for example) is used.

Moreover, when the optical transmission signal input portions 11 to 1N and optical transmission signal output portions 21 to 2N are provided for each route, the optical switch portion 3 is capable of switching the optical signals among the routes.

Figure 19:
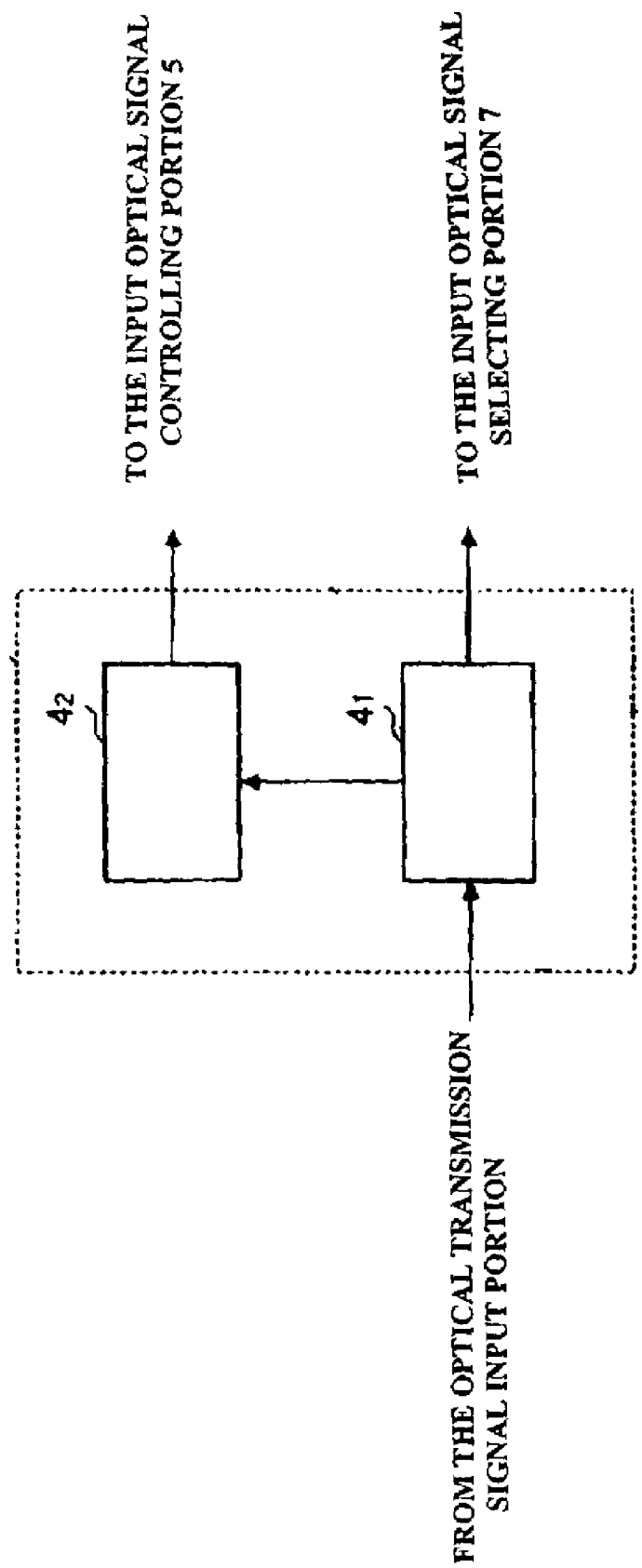
FIG. 19 is a diagram for describing an example of structure of an input signal monitoring portion.

The input signal monitoring portion 4 has a structure, for example, illustrated in FIG. 19. The optical signals supplied from the optical transmission signal input portions are partly branched by a branching portion $4_1$ and the branched optical signal is monitored. Here, an optical level of the optical signal is monitored to generate an electrical signal corresponding to the optical level of the optical signal. Thereafter, such electrical signal is supplied to an input optical signal controlling portion. The branching portion $4_1$ may be integrated with the optical signal monitoring portion $4_2$ or the optical signal is controlled in direct without conversion into an electrical signal.

The monitoring signal generating portion 6 generates a monitoring signal to ensure the verification of the switching operation because such switching operation cannot be verified for each route when the optical signal in the route corresponding to the monitoring signal generating portion 6 is not transmitted or the signal level is the predetermined level or less if such optical signal is transmitted. When the optical signal is not transmitted or the signal level is the predetermined level or less if such optical signal is transmitted, these phenomena suggest occurrence of failure in the transmission line or non-use of the line or the like. Even when a failure occurs in the transmission line or the transmission line is not used, the monitoring signal generating portion 6 generates a monitoring signal in order to realize the monitoring of the optical switch portion 3.

The input optical signal controlling portion 5 receives a signal depending on the optical level of the optical signal from the input signal monitoring portion 4 and controls the input optical signal selecting portion 7. When the optical level of the optical signal from the input signal monitoring portion 4 is the predetermined level or more, the input optical signal selecting portion 7 is controlled to supply the optical signal supplied from the optical transmission signal input portion to the optical switch portion 3. When the optical level of the optical signal supplied from the input signal monitoring portion 4 is the predetermined level or less, the input optical signal selecting portion 7 is controlled to supply the monitoring signal generated by the monitoring signal generating portion 6 to the optical switch portion 3.

The input optical signal selecting portion 7 has only one output terminal for two input terminals and is controlled with the optical signal controlling portion 5. With the control of the optical signal controlling portion 5, an optical signal supplied from the optical transmission signal input portion or a monitoring signal generated by the monitoring signal generating portion 6 is selected and is then supplied to the optical switch portion 3.

With such structure, optical levels of optical signals inputted to the optical transmission signal input portions $1_1$ to $1_N$ from the external side are always monitored and this condition is notified to the input optical signal controlling portions $5_1$ to $5_N$. The input optical signal controlling portions $5_1$ to $5_N$ control the input optical signal selecting portions $7_1$ to $7_N$, when the optical level is less than the predetermined level, to input a monitoring signal generated by the monitoring signal generating portion 6 to the optical switch portion 3. Moreover, when the optical level satisfies the predetermined constant level, the input optical signal selecting portions $7_1$ to $7_N$ are controlled to input the optical signals inputted to the optical transmission signal input portions $1_1$ to $1_N$ to the optical switch portion 3.

Here, the monitoring signal generating portion 6 may also be configured to always generate the monitoring signal but it can also be formed to generate the monitoring signal under the control of the input optical signal controlling portion 5 only for the period in which the monitoring signal is elected by the input optical signal selecting portion 7 (it is also possible to include the preceding and subsequent periods of the selected period).

According to the first embodiment, an optical signal may always be inputted to the optical switch portion 3 without relation to the input condition of an optical signal from the external side and the optimized operation can always be performed in the optical switch.

Figure 3:
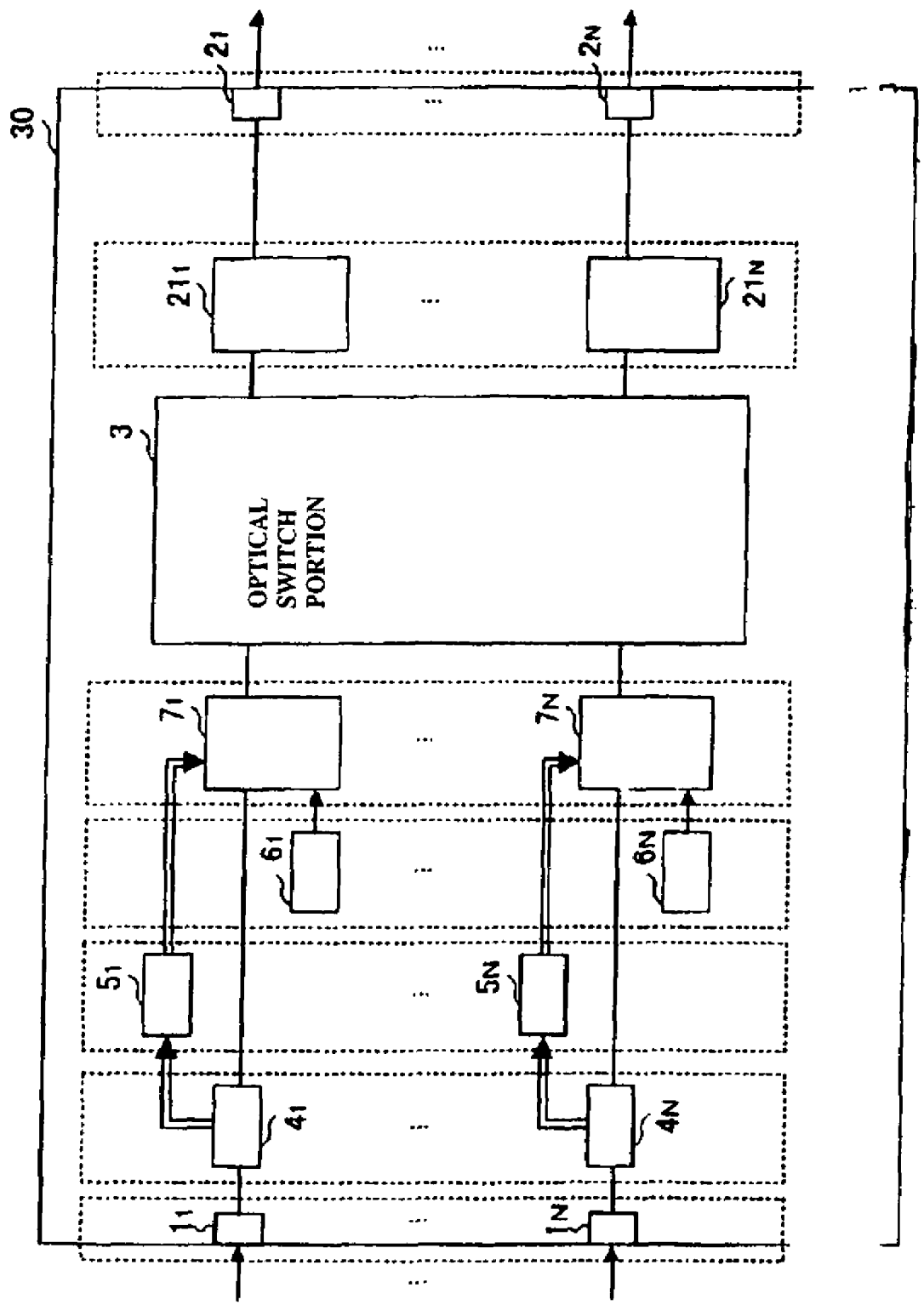
FIG. 3 is a diagram for describing an example of structure of the optical crossconnect device of the second embodiment.

FIG. 3 illustrates an example of structure of an optical crossconnect device of the second embodiment. The optical crossconnect device of FIG. 2 is formed of optical transmission signal input portions 11 to 1N, optical transmission signal output portions, 21 to 2N, an optical switch portion 3, input signal monitoring portions $4_1$ to $4_N$, input optical signal controlling portions $5_1$ to $5_N$, monitoring signal generating portions $6_1$ to $6_N$, input optical signal selecting portions $7_1$ to $7_N$, and output signal monitoring portions $21_1$ to $21_N$.

The optical crossconnect device 30 of the second embodiment is also provided the output signal monitoring portions $21_1$ to $21_N$ in the subsequent stage of the optical switch portion 3 in FIG. 2 of the first embodiment.

Figure 20:
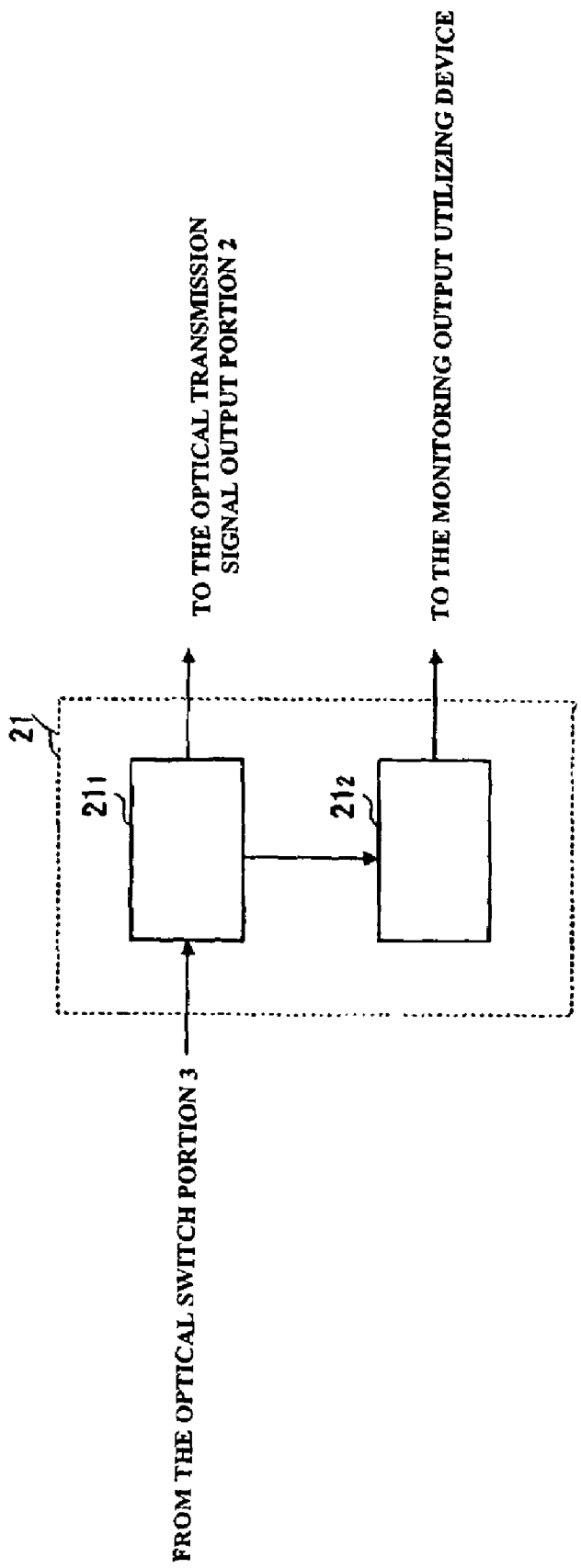
FIG. 20 is a diagram for describing an example of structure of an output signal monitoring portion.

The output signal monitoring portion 21 is configured, for example, as illustrated in FIG. 20. Namely, the output monitoring portion 21 includes a branching portion $21_1$ and an optical signal monitoring portion $21_2$. An optical signal outputted from the optical switch portion 3 is partially branched by the branching portion $21_1$ and is then monitored. Here, an optical level of optical signal is monitored and the information thereof is supplied to a device utilizing an monitoring output (not illustrated). The information obtained from the output signal monitoring portion 21 includes the data suggesting existence or no-existence of the optical signal and the optical level data of optical signal or the like.

The device utilizing the monitoring output performs various operations based on the information supplied from the output signal monitoring portion 21. For example, such operations include detection, notification and recover of failure, automatic adjustment of mirror angle of the optical switch, update of software of the optical switch or the like.

Moreover, the device utilizing monitoring output is also capable of monitoring the transmission line or the like based on the information obtained as a result of monitoring of the monitoring signal transmitted from the optical crossconnect device of the preceding stage (existing in the remote area) by the output signal monitoring portion 21 of the relevant optical crossconnect device.

As described for the first embodiment, since the input side of the optical switch portion 3 is always maintained in the condition where an optical signal is always inputted, a failure of the optical switch portion 3 can be monitored, according to the second embodiment, without relation to the optical signal input condition from the external side by monitoring an output signal level of the optical switch portion 3 with the output signal monitoring portions $21_1$ to $21_N$.

Figure 4:
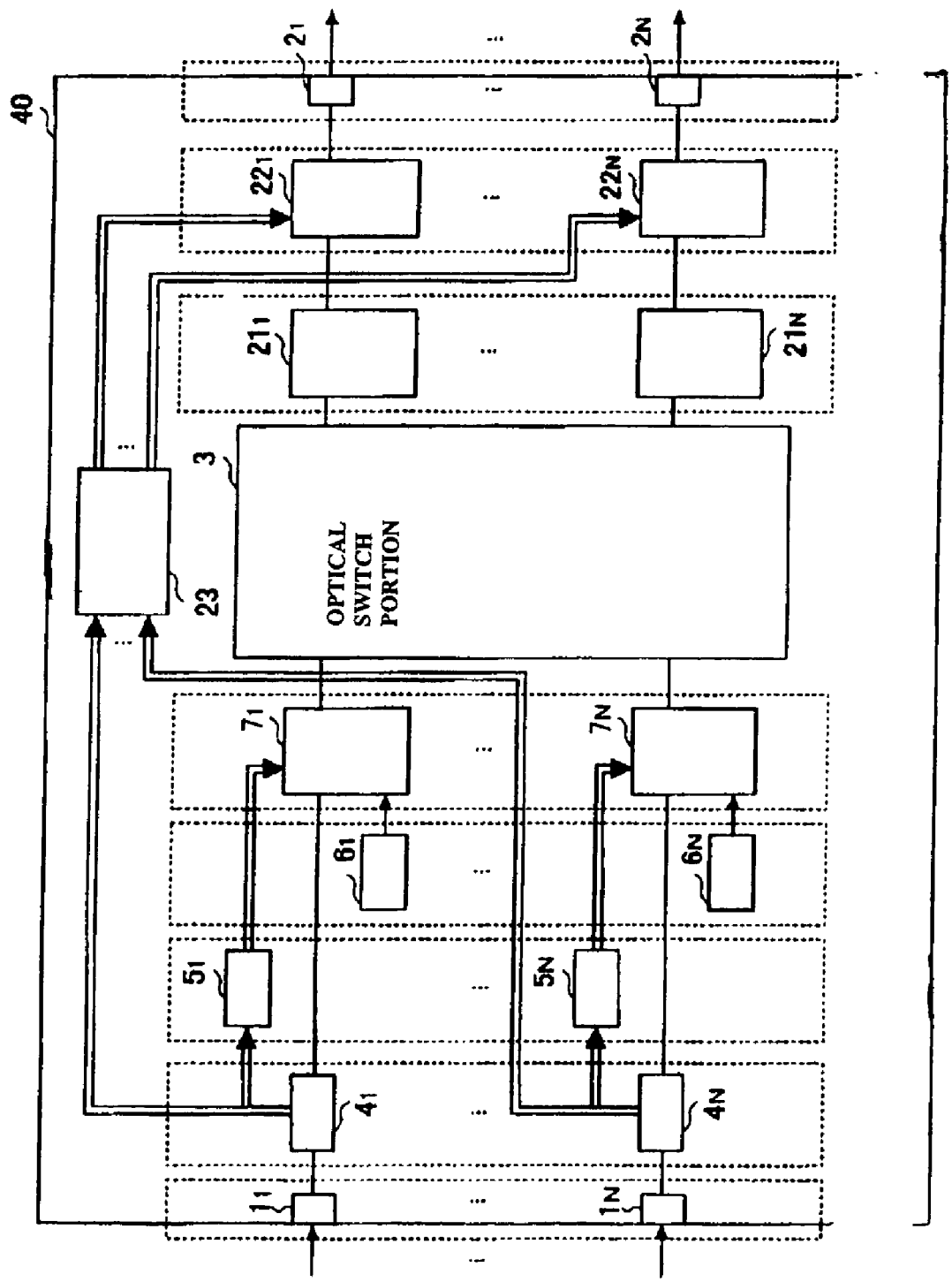
FIG. 4 is a diagram for describing an example of structure of the optical crossconnect device of the third embodiment.

FIG. 4 illustrates an example of structure of an optical crossconnect device of the third embodiment of the present invention. The optical crossconnect device 40 of FIG. 4 comprises optical transmission signal input portions $1_1$ to $1_N$, optical transmission signal output portions $2_1$ to $2_N$, an optical switch portion 3, input signal monitoring portions $4_1$ to $4_N$, input optical signal controlling portions $5_1$ to $5_N$, monitoring signal generating portions $6_1$ to $6_N$, input optical signal selecting portions $7_1$ to $7_N$, output signal monitoring portions $21_1$ to $21_N$, output cut-off portions $22_1$ to $22_N$, and an output optical signal controlling portion 23.

The optical crossconnect device 40 of the third embodiment is provided with the output cut-off portions $22_1$ to $22_N$ in the preceding stage of the optical output portion 2 (or subsequent stage of the optical switch portion 3) of FIG. 3 of the second embodiment and is further provided with the output optical signal controlling portion 23 for controlling the output cut-off portions $22_1$ to $22_N$.

The output cut-off portion 22 is the circuit for cutting off an input signal and is controlled with the output optical signal controlling portion 23. As the output cut-off portion 22, a structure, for example, illustrated in FIG. 20 is used. This structure has two output terminals for only one input terminal and is controlled with the output optical signal controlling portion 23. An output signal from the optical switch portion 3 is supplied, via the output signal monitoring portion 21, to the optical signal output 2 or terminating portion or monitoring signal processing portion (not illustrated) under the control of the output optical signal controlling portion 23.

The output optical signal controlling portion 23 receives a signal depending on the optical level of optical signal from the input signal monitoring portion 4 and controls the output cut-off portion 22. When an optical level of optical signal from the input signal monitoring portion 4 is the predetermined level or more, the output cut-off portion 22 is controlled to supply an output signal from the optical switch portion 3 to the optical transmission signal output portion 2 (①). When an optical level of optical signal from the input signal monitoring portion 4 is the predetermined level or less, the output cut-off portion 22 is controlled to supply an output signal from the optical switch 3 to the optical signal output 2 or terminating portion or the monitoring signal processing portion or the like ((②)) in view of cutting off the supply of signal to the optical transmission signal output portion 2.

The output optical signal controlling portion 23 is capable of holding the connection information of an input port and an output port of the optical switch portion 3 and moreover detecting the input port to which the monitoring signal generated by the monitoring signal generating portion 6 is impressed and the output port from which the monitoring signal is outputted because the signal is received depending on optical level of optical signal from the input signal monitoring portion 4.

Therefore, the output optical signal controlling portion 23 is capable of controlling the output cut-off portion 22 to cut off only the monitoring signal from the output port from which the monitoring signal is outputted.

In the third embodiment, the output cut-off portion 22 is provided to cut off the monitoring signal in the subsequent stage of the optical switch portion 3 considering the case where transmission of the monitoring signal generated by the monitoring signal generating portion 6 to the external side is not allowed. However, this output cut-off portion 22 is controlled with the output optical signal controlling portion 23 not to cut off the main signal other than the monitoring signal generated by the monitoring signal generating portion 6.

This output optical signal controlling portion 23 holds the connection information of the input port and output port of the optical switch portion 3 and cuts off the monitoring signal generated by the monitoring signal generating portion 6 by controlling the output cut-off portion 22 of the output port corresponding to the input port when an optical level of the input signal monitoring portion 4 is lower than the predetermined level. On the contrary, when an optical level of the input signal monitoring portion 4 satisfies the predetermined level, the output optical signal controlling portion 23 allows such optical signal to pass.

According to the third embodiment, it is also possible to control the operation so that the monitoring signal generated by the monitoring signal generating portion 6 is not transmitted to the external side.

Figure 5:
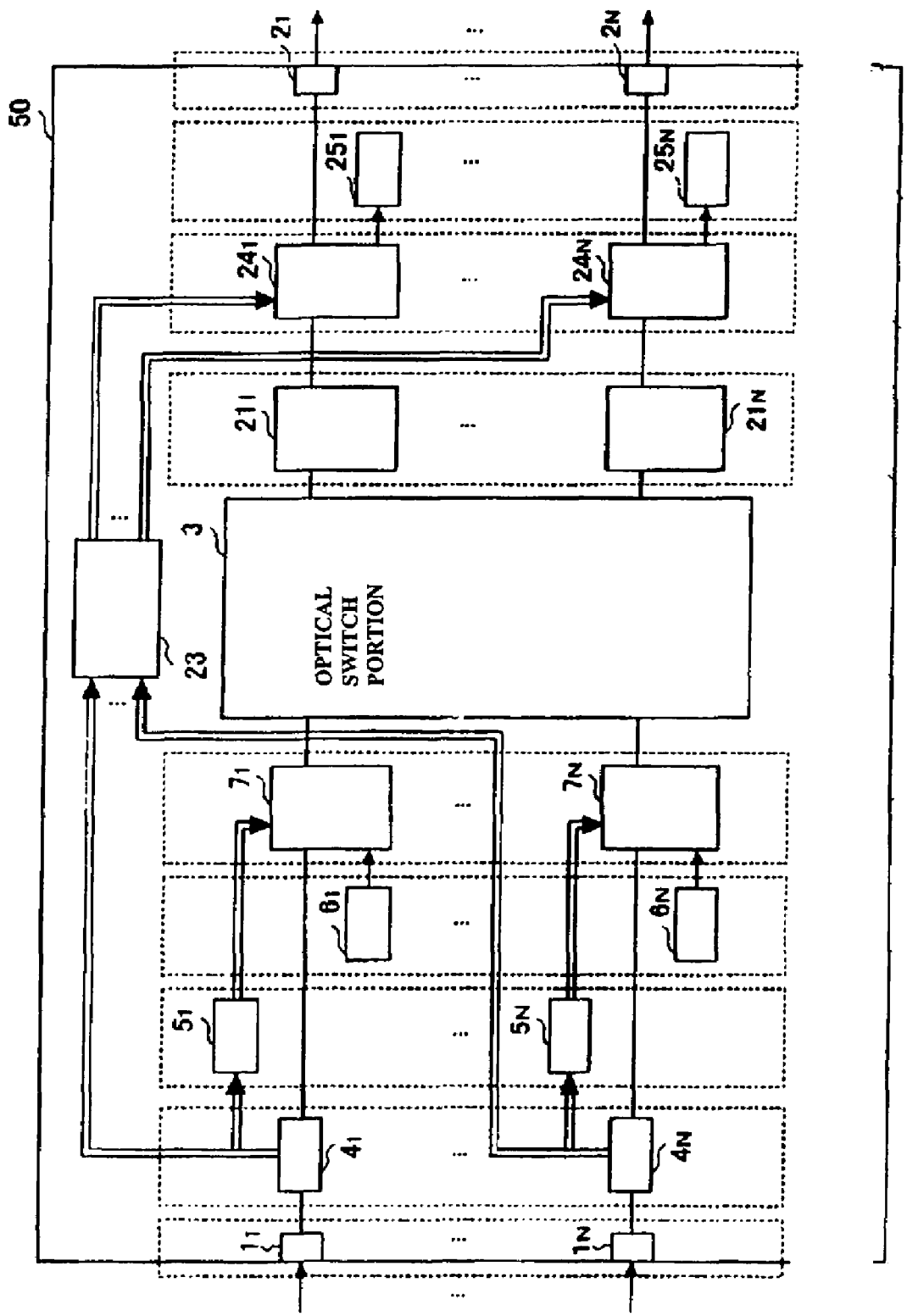
FIG. 5 is a diagram for describing an example of structure of the optical crossconnect device of the fourth embodiment.

FIG. 5 illustrates an example of structure of the optical crossconnect device of the fourth embodiment. The optical crossconnect device of FIG. 5 comprises Optical transmission signal input portions $1_1$ to $1_N$, optical transmission signal output portions $2_1$ to $2_N$, an optical switch portion 3, input signal monitoring portions $4_1$ to $4_N$, input optical signal controlling portions $5_1$ to $5_N$, monitoring signal generating portions $6_1$ to $6_N$, input optical signal selecting portions $7_1$ to $7_N$, output signal monitoring portions $21_1$ to $21_N$, an output optical signal controlling portion 23, output destination selecting portions $24_1$ to $24_N$ and monitoring signal processing portions $25_1$ to $25_N$.

The optical crossconnect device 50 of the fourth embodiment is provided with the output cut-off portion 22 of FIG. 4 of the third embodiment which is configured with the output destination selecting portions $24_1$ to $24_N$ like the 1×n optical switch and the monitoring signal processing portions $25_1$ to $25_N$.

Figure 21:
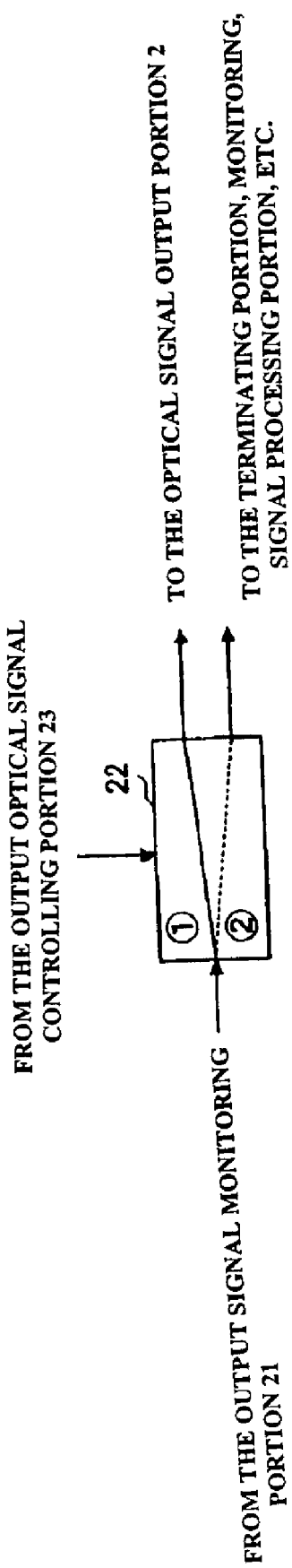
FIG. 21 is a diagram for describing an example of structure of an output cut-off portion.

Examples of the structures of the output destination selecting portions $24_1$ to $24_N$ and monitoring signal processing portions $25_1$ to $25_N$ are illustrated in FIG. 21. The output destination selecting portion 24 includes two output terminals for only one input terminal and is controlled with the output optical signal controlling portion 23. The monitoring signal processing portion 25 is composed of a photo-electrical converting portion $25_1$ and signal processing portion $25_2$ and transmits the processed signal to the monitoring signal utilizing device by processing the monitoring signal.

The output optical signal controlling portion 23 receives a signal depending on optical level of optical signal from the input signal monitoring portion 4 and controls the output destination selecting portion 24. When an optical level of optical signal from the input signal monitoring portion 4 is the predetermined level or more, the output destination selecting portion 24 is controlled to supply an output signal from the optical switch portion 3 to the optical transmission signal output portion 2 (①). When an optical level of optical signal from the input signal monitoring portion 4 is less than the predetermined level, an output signal from the optical switch portion 3 is supplied to the monitoring signal processing portion 25 (②).

Thereby, the output destination selecting portion 24 can inhibit transmission of the monitoring signal generated by the monitoring signal generating portion 6 to the external side as in the case of the third embodiment and moreover can effectively use the monitoring signal by extracting and monitoring the monitoring signal not transmitted to the external side.

For example, when a test signal pattern is used as the monitoring signal generated by the monitoring signal generating portion 6, the optical switch portion 3 can be monitored with higher accuracy by processing the test signal pattern with the monitoring signal processing portion 25.

According to the fourth embodiment, not only the monitoring signal generated by the monitoring signal generating portion 6 can be cut off for the external side but also the monitoring signal can be used effectively by extracting and monitoring the monitoring signal.

Moreover, when the monitoring signal modulated by a particular signal (for example, test signal pattern) is used as the monitoring signal in place of the frequency signal, the optical switch maybe monitored with various higher accuracies.

Figure 6:
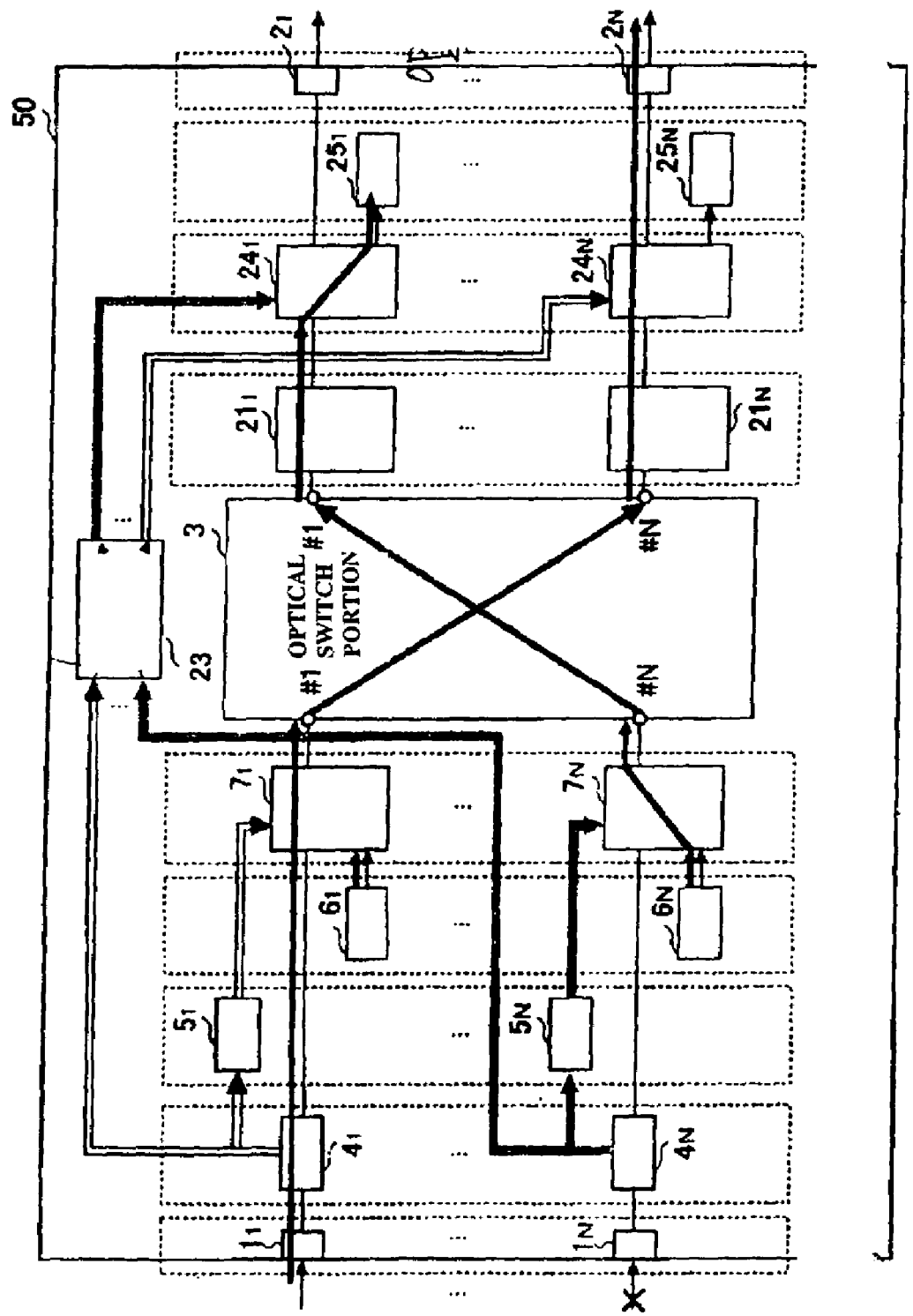
FIG. 6 is a diagram for describing an example of operation of the crossconnect device of the fourth embodiment.

Operation example of the optical crossconnect device of the fourth embodiment is illustrated in FIG. 6.

First, an optical signal #1 is inputted to the optical transmission signal input portion $1_1$ from the external side and an optical signal #n, to the optical transmission signal input portion $1_N$. Here, it is assumed that the optical signals #1 and #n are respectively switched with the optical switch portion 3 and are then outputted to the external side through the optical transmission signal output portions $2_N$ and $2_1$. It is also assumed here that the optical signal #n being inputted to the optical transmission signal input portion $1_N$ becomes OFF due to a failure. Since the signal level becomes the predetermined level or less at the input signal monitoring portion $4_N$, OFF condition of the optical signal #n is detected. The input optical signal controlling portion 23 controls the input selecting portion $7_N$ based on this detected signal and transfers the monitoring signal generated by the monitoring signal generating portion, 6N to the optical switch portion 3 in place of the optical signal #n. Moreover, since the output optical signal controlling portion 23 simultaneously detects occurrence of a failure in the optical signal #n and also detects that the output port corresponding to the optical signal #n is #1, it controls the output destination selecting portion $24_1$ corresponding to the output port #1 to output the monitoring signal to the monitoring signal processing portion $25_N$.

Even when an optical signal is not inputted, from the beginning, to the particular optical transmission signal input portion from the external side, the similar operation is performed. Since the monitoring signal is inserted in place of the optical signal of the particular optical transmission signal input portion to which the optical signal is not inputted from the external side, the optical signal is supplied to all input ports of the optical switch portion 3. Accordingly, operations of all input ports of the optical switch portion 3 can be verified. In addition, the monitoring signal inserted is controlled not to be transmitted to the external side with the output optical signal controlling portion 23.

Moreover, when a failure of the optical signal #n is recovered, the normal signal can be detected with the monitoring portion $4_N$. The input optical signal controlling portion 23 switches the input selecting portion $7_N$ based on this detected information and transmits the optical signal #n to the optical switch portion 3 in place of the monitoring signal. Moreover, the output optical signal controlling portion 23 simultaneously detects recovery of failure in the optical signal #n and controls the output destination selecting portion $24_1$ at the output port #1 of the optical signal #n to output the optical signal #n to the optical transmission signal output portion $2_1$.

Figure 7:
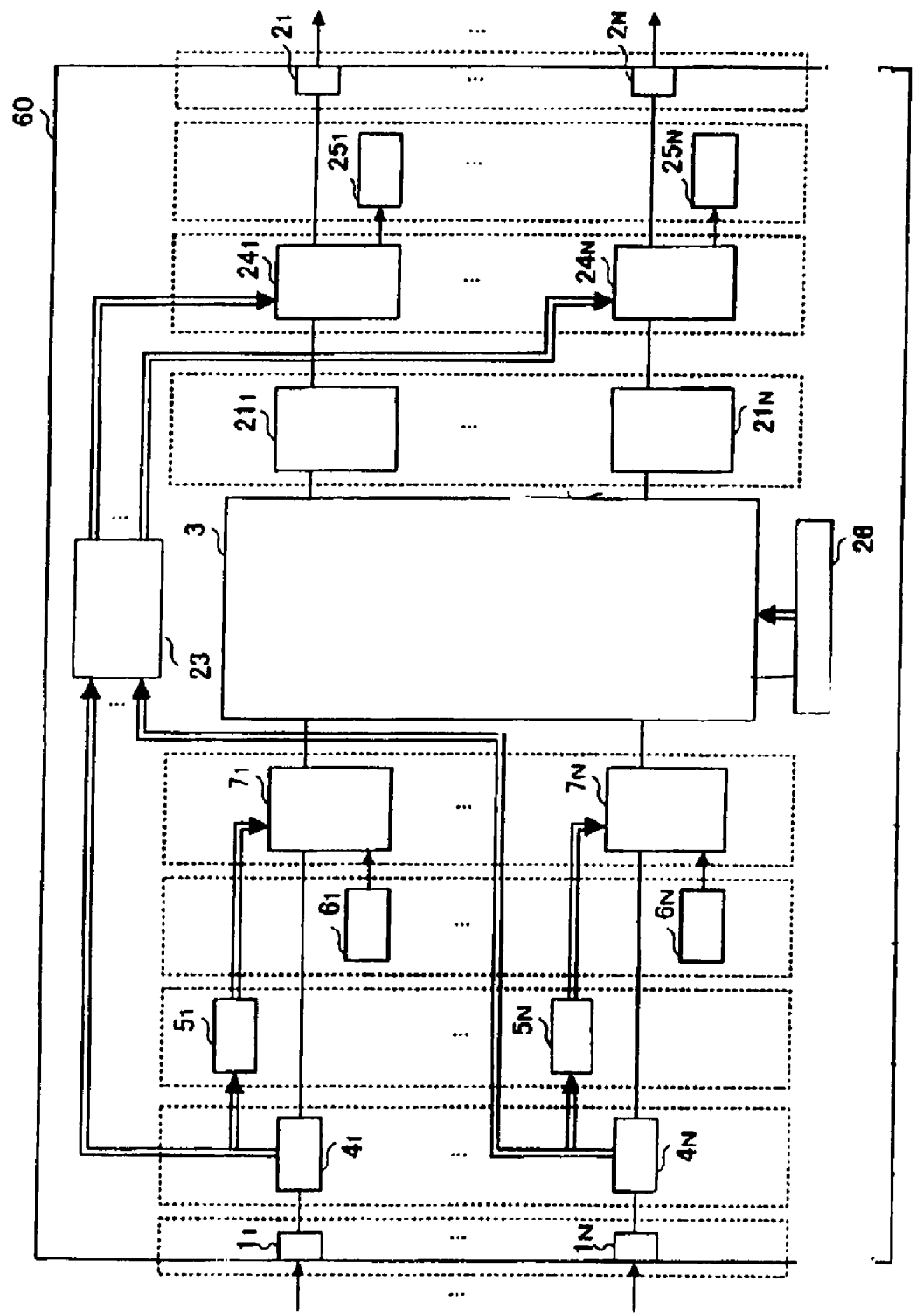
FIG. 7 is a diagram for describing an example of structure of the optical crossconnect device of the fifth embodiment.

FIG. 7 illustrates an example of structure of the optical crossconnect device of the fifth embodiment. The optical crossconnect device of FIG. 7 comprises optical transmission signal input portion $1_1$ to $1_N$, optical transmission signal output portion 21 to 2N, an optical switch portion 3, input signal monitoring portions $4_1$ to $4_N$, input optical signal controlling portions $5_1$ to $5_N$, monitoring signal generating portions $6_1$ to $6_N$, input optical signal selecting portions $7_1$ to $7_N$, output signal monitoring portions $21_1$ to $21_N$, an output optical signal controlling portion 23, output destination selecting portions $24_1$ to $24_N$, monitoring signal processing portions $25_1$ to $25_N$ and an optical switch controlling portion 26.

The optical crossconnect device 60 of the fifth embodiment is configured with addition the optical switch controlling portion 26 to the optical crossconnect device 50 of FIG. 5 of the fourth embodiment.

The optical switch controlling portion 26 controls connection between non-used input port and non-used output port of the optical switch portion 3.

For example, the switching operation between the non-used ports of the optical switch portion 3 can be verified when the optical switch controlling portion 26 periodically switches the switching conditions of the non-used ports. Moreover, the normal operation of the function of the optical switch portion 3 can be verified when the optical switch controlling portion 26 connects the input port and output port immediately before a user uses these input and output ports.

The function of the optical switch portion 3 can be verified by processing the monitoring signal in the output signal monitoring portion 21 or the monitoring signal processing portion 25.

According to the fifth embodiment, potential failure of the optical switch portion 3 can be prevented and it is also possible to prevent occurrence of the phenomenon that a failure of the optical switch portion 3 is detected initially when a user inputs an optical signal to the device.

Figure 8:
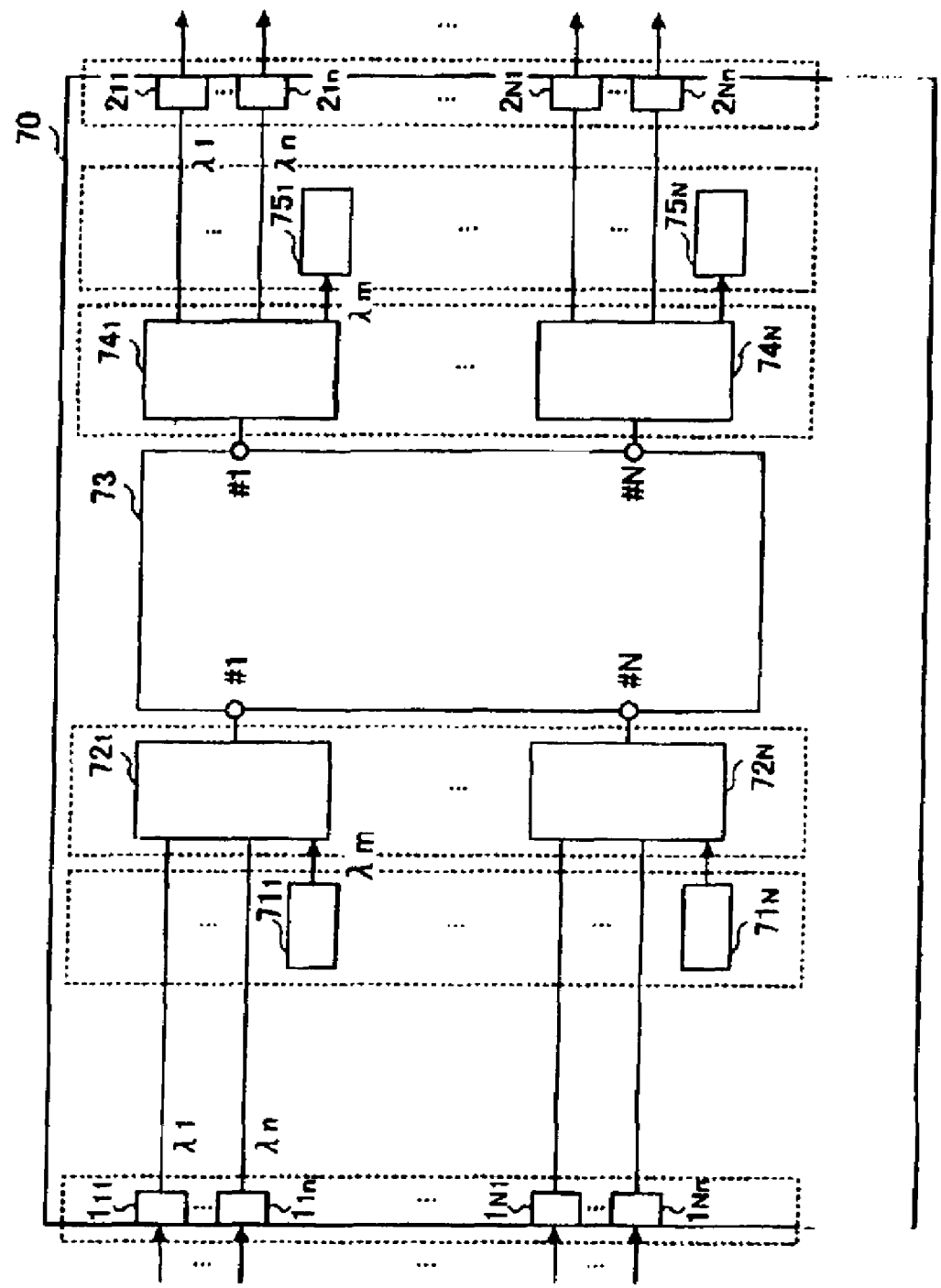
FIG. 8 is a diagram for describing an example of structure of the optical crossconnect device of the sixth embodiment.

FIG. 8 illustrates an example of structure of the optical crossconnect device of the sixth embodiment. The optical crossconnect device 70 of FIG. 8 comprises optical transmission signal input portions $1_{11}$ to $1_{Nn}$, optical transmission signal output portions $2_{11}$ to $21_{Nn}$, an optical switch portion 73, monitoring signal generating portions $71_1$ to $71_N$, multiplexers $72_1$ to $72_N$, demultiplexers $74_1$ to $74_N$, and monitoring signal processing portions $75_1$ to $75_N$.

First, when attention is paid to an optical signal inputted to the optical crossconnect device 70, the optical signal inputted to the optical transmission signal input portions $1_{11}$ to $1_{Nn}$ of the optical crossconnect device 70 is multiplexed in unit of n-waveform with the multiplexers $72_1$ to $72_N$ to become the N multiplex optical signals and are then supplied to the input ports (#1 to #N) of the N optical switch portions 3. The multiplex signals supplied to the N input ports are respectively switched by the optical switch portion 3 and are then outputted from the predetermined output ports (#1 to #N). The multiplex optical signals outputted from the output ports are then demultiplexed with the demultiplexer 74 and thereby the optical signal in unit of wavelength are outputted from the optical transmission signal output portions $2_1$ to $2_N$. Moreover, the optical signals in unit of wavelength are impressed to the optical transmission signal input portions $1_1$ to $1_N$ and the optical switch portion 3 performs the switching in unit of wavelength group.

As described above, the optical signals (wavelength: λ1 to λn) inputted to the optical transmission signal input portions $1_{11}$ to $1_{1n}$ of the optical crossconnect device 70 are multiplexed with the multiplexer $72_1$ and then inputted to the input port #1 of the optical switch portion 3. In the same manner, the optical signals (wavelength: λ1 to λn) inputted to the optical transmission signal input portions $1_{N1}$ to $1_{Nn}$ of the optical crossconnect device 70 are multiplexed with the multiplexer 72N and is then supplied to the input port #N of the optical switch portion 3.

Next, the monitoring signal will be described. The monitoring signal of wavelength λm (wavelength which is different from the wavelengths λ1 to λn) generated by the monitoring signal generating portion $71_1$ is multiplexed, with the multiplexer $72_1$, with the optical signals of wavelengths $\lambda 1$ to $\lambda n$ inputted to the optical transmission signal input portions $1_{11}$ to $1_{1n}$. In the same manner, the monitoring signal of wavelength $\lambda m$ generated by the monitoring signal generating portion $71_N$ are multiplexed, in the multiplexer $72_N$, with the optical signals of wavelengths $\lambda 1$ to $\lambda n$ inputted to the optical transmission signal input portions $1_{N1}$ to $1_{Nn}$ and are then supplied to the input port #N of the optical switch portion 3. Accordingly, the monitoring signal of wavelength $\lambda m$ is multiplexed for every optical signal of wavelengths $\lambda 1$ to $\lambda n$ and is then supplied to the input port of the optical switch portion 3. Therefore, at least the monitoring signal of wavelength $\lambda m$ is supplied to all input ports of the optical switch portion 3 without relation to the input condition of the optical signal from the external side and the input port to which the optical signal is not inputted does not exist.

The optical switch portion 3 performs the switching operation between the input ports #1 to #N and output ports #1 to #N in unit of wavelength group (wavelength: $\lambda 1$ to $\lambda n$, $\lambda m$). The optical signals of wavelength $\lambda 1$ to $\lambda n$ at the switched output port #1 are demultiplexed into the optical signals of wavelengths $\lambda 1$ to $\lambda n$ with the demultiplexer $74_1$ and are then outputted from the optical transmission signal output portions $2_{11}$ to $2_{1n}$. In the same manner, the optical signals of wavelengths $\lambda 1$ to $\lambda n$ at the output port #N are demultiplexed into the optical signals of wavelengths $\lambda 1$ to $\lambda n$ with the demultiplexer $74_N$ and are then outputted respectively from the optical transmission signal output ports $3_{N1}$ to $2_{Nn}$.

Moreover, the monitoring signal of wavelength $\lambda m$ is demultiplexed with the demultiplexers $74_1$ to $74_N$ and are then supplied to the monitoring signal processing portions $75_1$ to $75_N$.

Moreover, according to the sixth embodiment, the input switching process for the external input optical signals described in the first to fifth embodiments may be eliminated by multiplexing the monitoring signal of wavelength $\lambda m$ generated by the monitoring signal generating portion 71 for the external input optical signals of wavelengths. $\lambda 1$ to $\lambda n$.

Even with the sixth embodiment, an optical signal can always be inputted to the optical switch portion 3 without relation to the input condition of optical signal from the external side and the optimized operation of the optical switch can always be realized.

Figure 9:
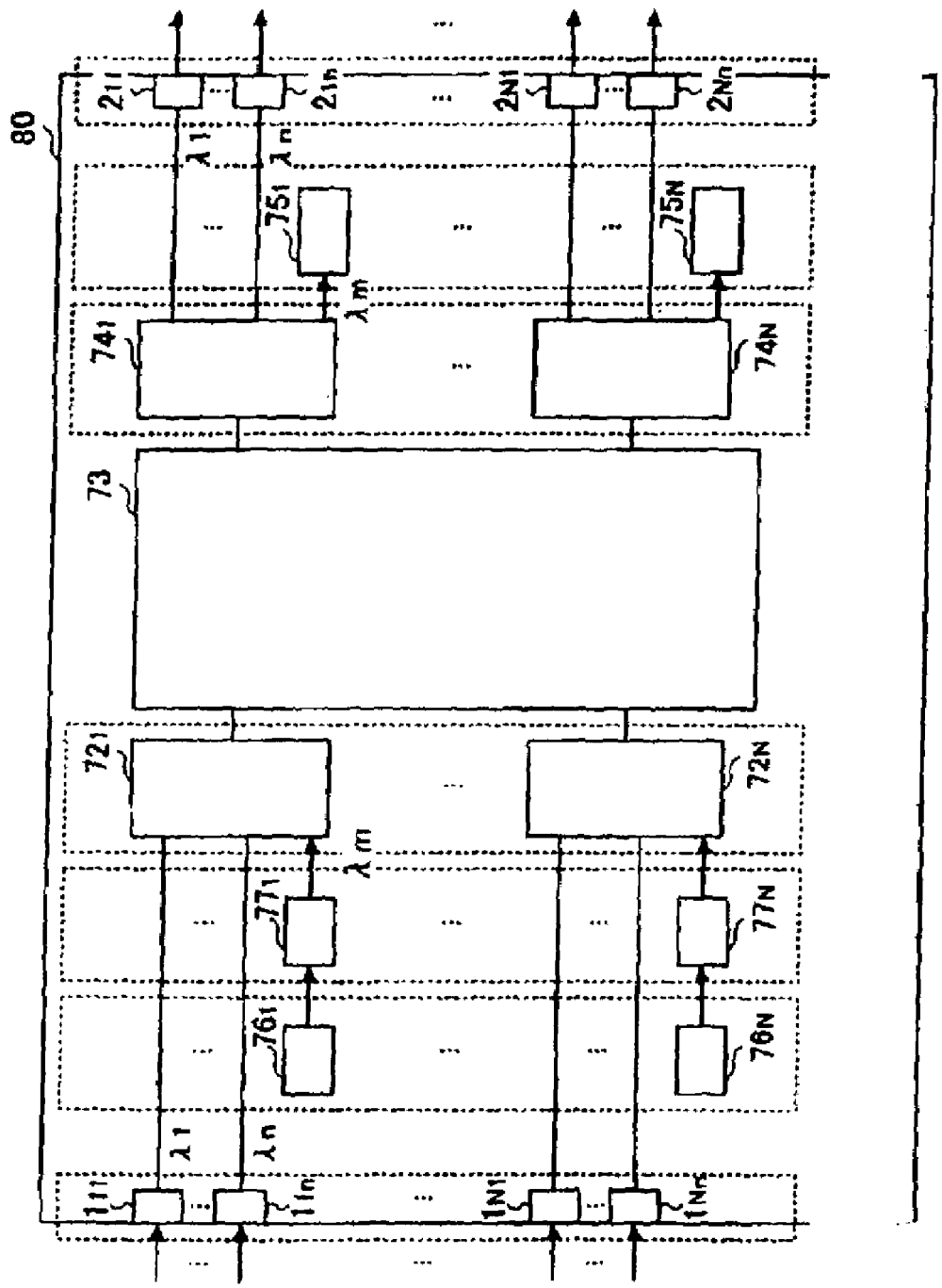
FIG. 9 is a diagram for describing an example of structure of the optical crossconnect device of the seventh embodiment.

FIG. 9 illustrates an example of structure of the optical crossconnect device of the seventh embodiment. The optical crossconnect device of FIG. 9 comprises optical transmission signal input portions $1_{11}$ to $1_{Nn}$, optical transmission signal output portions $2_{11}$ to $2_{Nn}$, an optical switch portion 73, multiplexers $72_1$ to $72_N$, demultiplexers $74_1$ to $74_N$, monitoring signal processing portions $75_1$ to $75_N$, monitoring signal generating portions $76_1$ to $76_N$, and wavelength converting portions $77_1$ to $77_N$.

The optical crossconnect device 80 of the seventh embodiment includes the monitoring signal generating portions 711 to 71N in FIG. 8 of the sixth embodiment formed of the monitoring signal generating portions $76_1$ to $76_N$ and wavelength converting portions $77_1$ to $77_N$.

The monitoring signal generating portion 71 of FIG. 8 in the sixth embodiment is required to generate the optical signals of wavelength $\lambda m$, while the monitoring signal generating portion 76 of FIG. 9 in the seventh embodiment converts the wavelength with the wavelength converting portion 77 for the monitoring signal generated with the monitoring signal generating portion 76. Therefore, the monitoring signal generating portion 76 which can generate the wavelength other than the wavelength $\lambda m$ may also be used.

Figure 10:
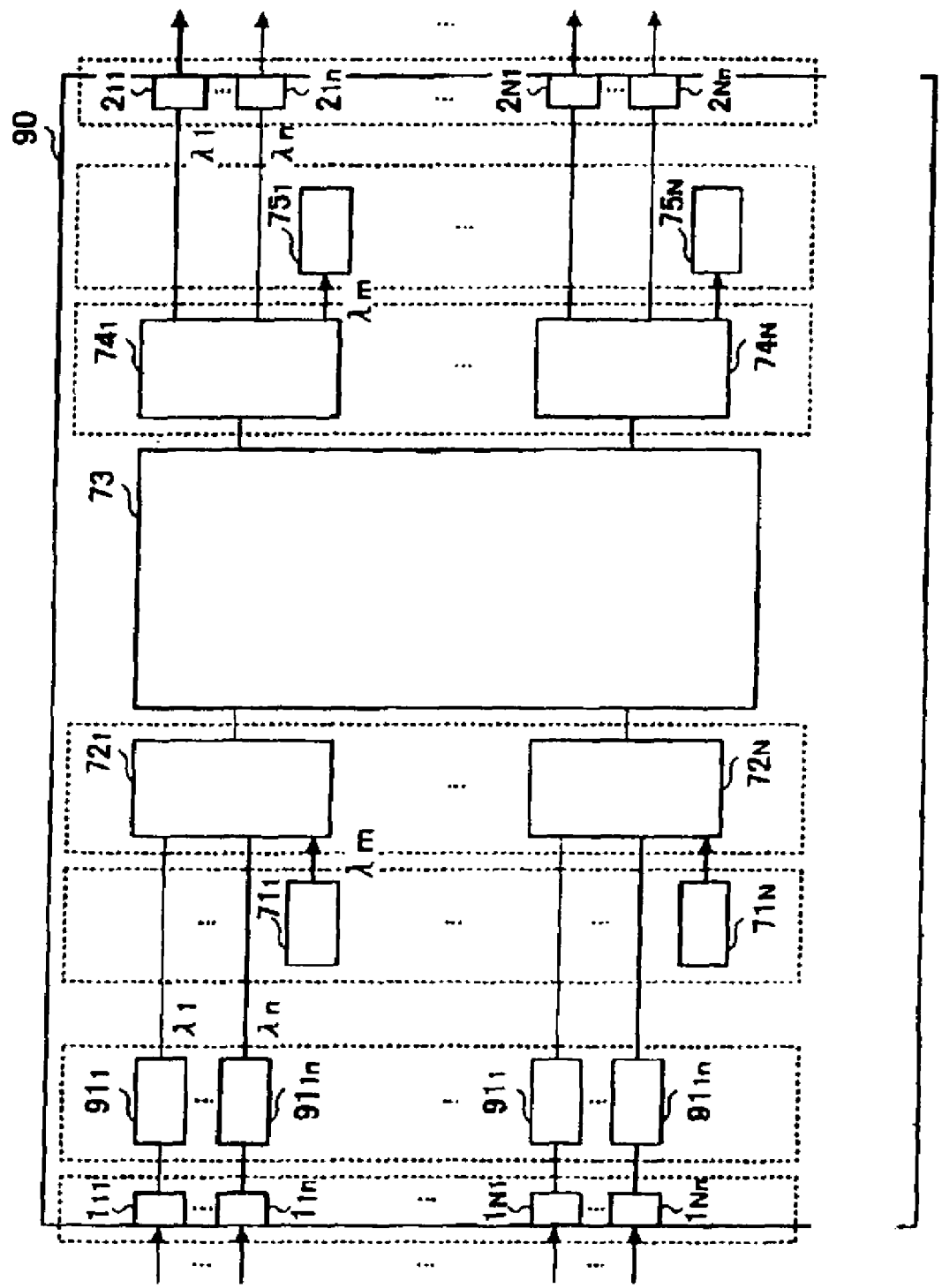
FIG. 10 is a diagram for describing an example of structure of the optical crossconnect device of the eighth embodiment.

FIG. 10 illustrates an example of structure of the optical crossconnect device of the eighth embodiment. The optical crossconnect device 90 of FIG. 10 comprises optical transmission signal input portions $1_{11}$ to $1_{Nn}$, optical transmission signal output portions $2_{11}$ to $2_{Nn}$, an optical switch portion 73, monitoring signal generating portions $71_1$ to $71_N$, multiplexers $72_1$ to $72_N$, demultiplexers $74_1$ to $74_N$, monitoring signal processing portions $75_1$ to $75_N$ and wavelength converting portions $9_{1N}$ to $9_{Nn}$.

The optical crossconnect device 90 of the eighth embodiment provides the wavelength converting portions $9_{11}$ to $9_{Nn}$ between the optical transmission signal input portions $1_{11}$ to $1_{Nn}$ and the multiplexers $72_1$ to $72_N$ in the optical crossconnect device 70 of FIG. 8 of the sixth embodiment.

According to the eighth embodiment, limitation on the wavelength of optical signal to be inputted to the multiplexer 72 can be eliminated by providing the wavelength converting portion 9 between the optical transmission signal input portion 1 and the multiplexer 72. Namely, the wavelength suitable for the multiplexer 72 can be supplied thereto without relation to the wavelength of transmission optical signal to be inputted to the optical transmission signal input portion 1.

The ninth embodiment is respectively described in regard to FIG. 8 to FIG. 10. Namely, the ninth embodiment is provided with the demultiplexer 74 between the optical switch portion 73 and the optical transmission signal output portion 2. Therefore, the output destination selecting portion 24 and the output optical signal controlling portion 23 in the fourth embodiment can be eliminated and the monitoring signal generated by the monitoring signal generating portion can always be extracted and monitored by the monitoring signal processing portion without giving any influence on the optical signal to be outputted to the external side.

Figure 11:
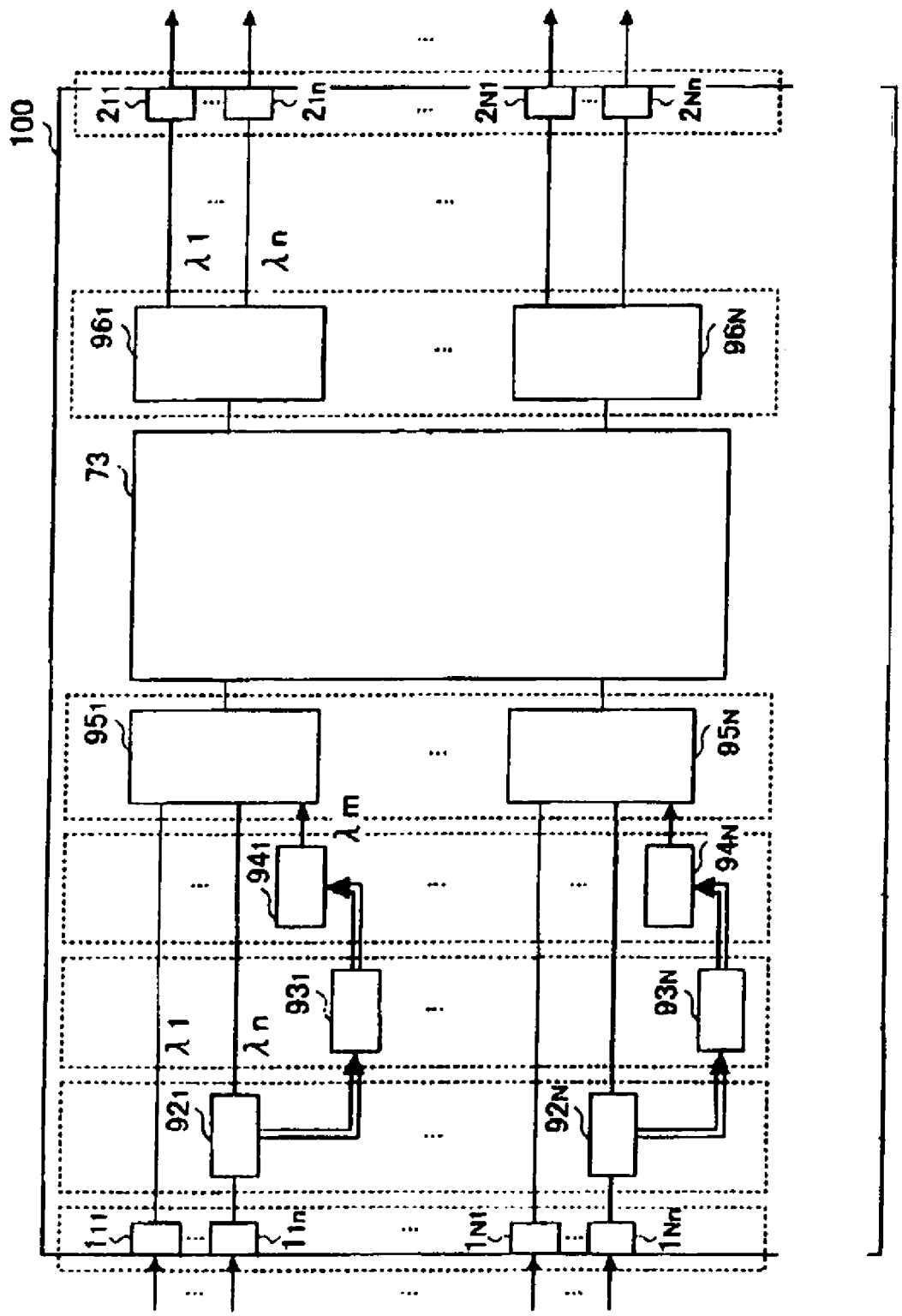
FIG. 11 is a diagram for describing an example of structure of the optical crossconnect device of the tenth embodiment.

FIG. 11 illustrates an example of structure of the optical crossconnect device of the tenth embodiment. The optical crossconnect device 100 of FIG. 11 comprises optical transmission signal input portions $1_{11}$ to $1_{Nn}$, optical transmission signal output portions $2_{11}$ to $2_{Nn}$, an optical switch portion 73, input signal monitoring portions $92_1$ to $92_N$, monitoring signal controlling portions $93_1$ to $93_N$, monitoring signal generating portions $94_1$ to $94_N$, multiplexers $95_1$ to $95_N$ and demultiplexers $96_1$ to $95_N$.

The input signal monitoring portions 921 to 92N monitors an optical level of the external input optical signal of wavelength $\lambda n$ among the external input optical signals of wavelengths $\lambda 1$ to $\lambda n$ supplied to the optical transmission signal input portion 1.

The monitoring signal controlling portion 93 receives a signal depending on an optical level of the optical signal of wavelength $\lambda n$ from the input signal monitoring portion 92 and controls the monitoring signal generating portion 94. When the optical level of optical signal from the input signal monitoring portion 92 is the predetermined level or more, the monitoring signal controlling portion 93 controls the monitoring signal generating portion 94 not to output the monitoring signal to the multiplexer 95. Moreover, when the optical level of signal from the input signal monitoring portion 92 is the predetermined level or less, the monitoring signal controlling portion 93 controls the monitoring signal generating portion 94 to supply the monitoring signal generated by the monitoring signal generating portion 6 to the multiplexer 95.

The monitoring signal generating portion 94 generates, in order to monitor the optical switch circuit 73, the monitoring signal of the wavelength (for example, wavelength λn) which is equal to one wavelength among the wavelengths (wavelengths: λ1 to λn) of the input optical signals supplied to the optical transmission signal input portion 1. The monitoring signal generating portion 94 is controlled with the monitoring signal controlling portion 93 to generate the monitoring signal.

The multiplexer 95 multiplexes the optical signals in unit of wavelength (wavelengths: λ1 to λn) to form the optical signals of wavelength group and then supplies the multiplexed optical signals of wavelength group to the optical switch portion 73.

According to the tenth embodiment, the input signal monitoring portion 92 monitors an optical level of external input optical signal of wavelength λn among the external input optical signals of wavelengths λ1 to λn supplied to the optical transmission signal, input portion 1. When the optical level of optical signal from the input signal monitoring portion 92 is the predetermined level or less, the monitoring signal of wavelength λn generated by the monitoring signal generating portion 6 is supplied to the optical switch portion 73. Accordingly, the optical signal of wavelength λn can always be supplied to the optical switch portion 73 without relation to the input condition of the optical signal from the external side and thereby the optimized operation of the optical switch portion 73 can be realized.

Figure 12:
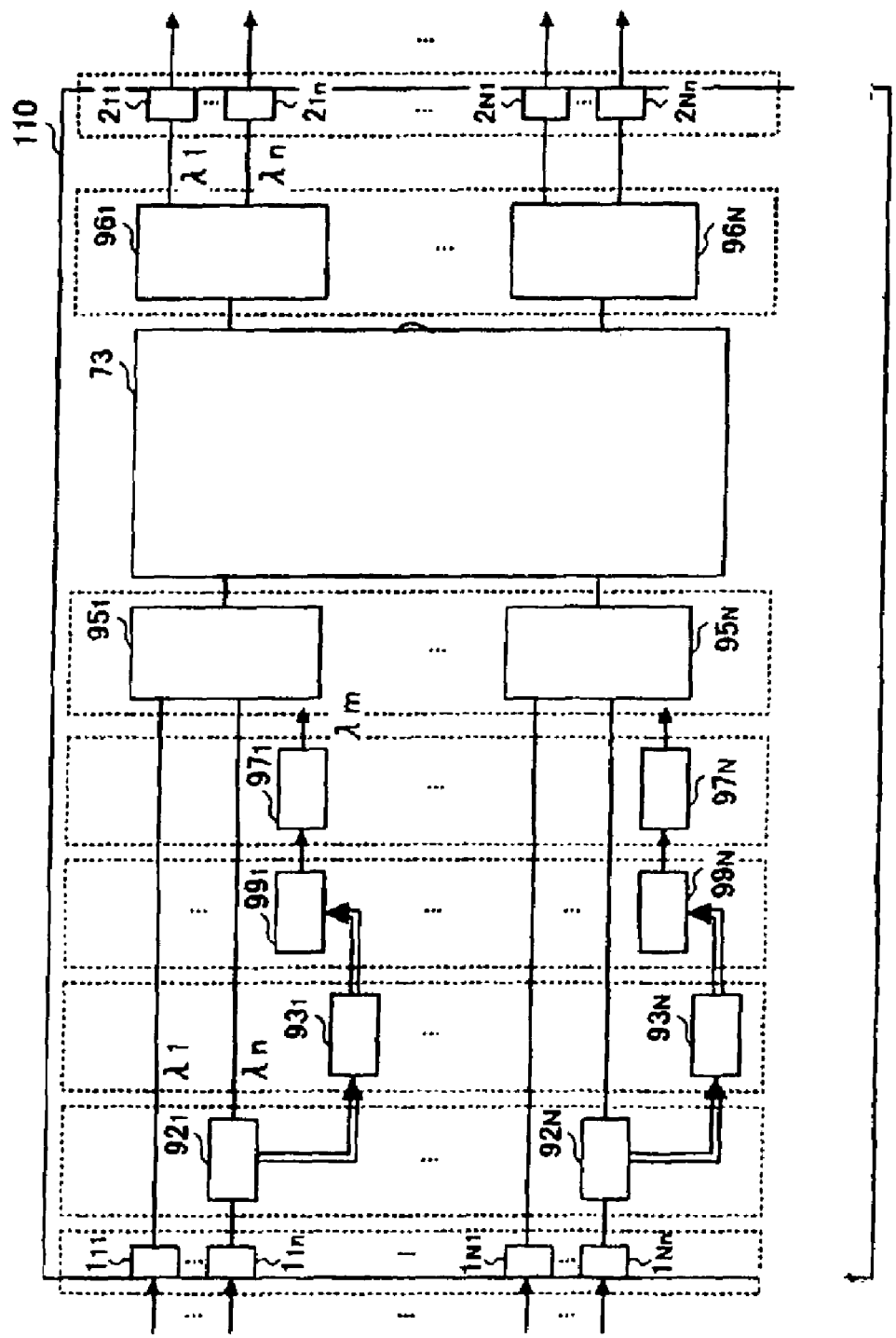
FIG. 12 is a diagram for describing an example of structure of the optical crossconnect device of the eleventh embodiment.

FIG. 12 illustrates an example of the structure of the optical crossconnect device of the eleventh embodiment. The optical crossconect device 110 of FIG. 12 comprises optical transmission signal input portions $1_{11}$ to $1_{Nn}$, optical transmission signal output portions $2_{11}$ to $2_{Nn}$, an optical switch portion 73, input signal monitoring portions $92_1$ to $92_N$, monitoring signal controlling portions $93_1$ to $93_N$, multiplexers $95_1$ to $95_N$, demultiplexers $96_1$ to $96_N$, wavelength converting portions $97_1$ to $97_N$, and monitoring signal generating portions $99_1$ to $99_N$.

The optical crossconnect device 110 of the eleventh embodiment also includes the monitoring signal generating portions $94_1$ to $94_N$ of FIG. 11 of the tenth embodiment which are formed of the monitoring signal generating portions $99_1$ to $99_N$ and wavelength converting portions $97_1$ to $97_N$.

According to the eleventh embodiment, since there is no limitation between the wavelength of optical signal monitored by the input signal monitoring portion 92 and the wavelength of the inserted optical signal of the monitoring signal generating portions $99_1$ to $99_N$, a degree of freedom for the wavelength of the optical signal inputted from the external side can be widened and this degree of freedom for the mounting position of the input signal monitoring portion 92 can also be widened.

Figure 13:
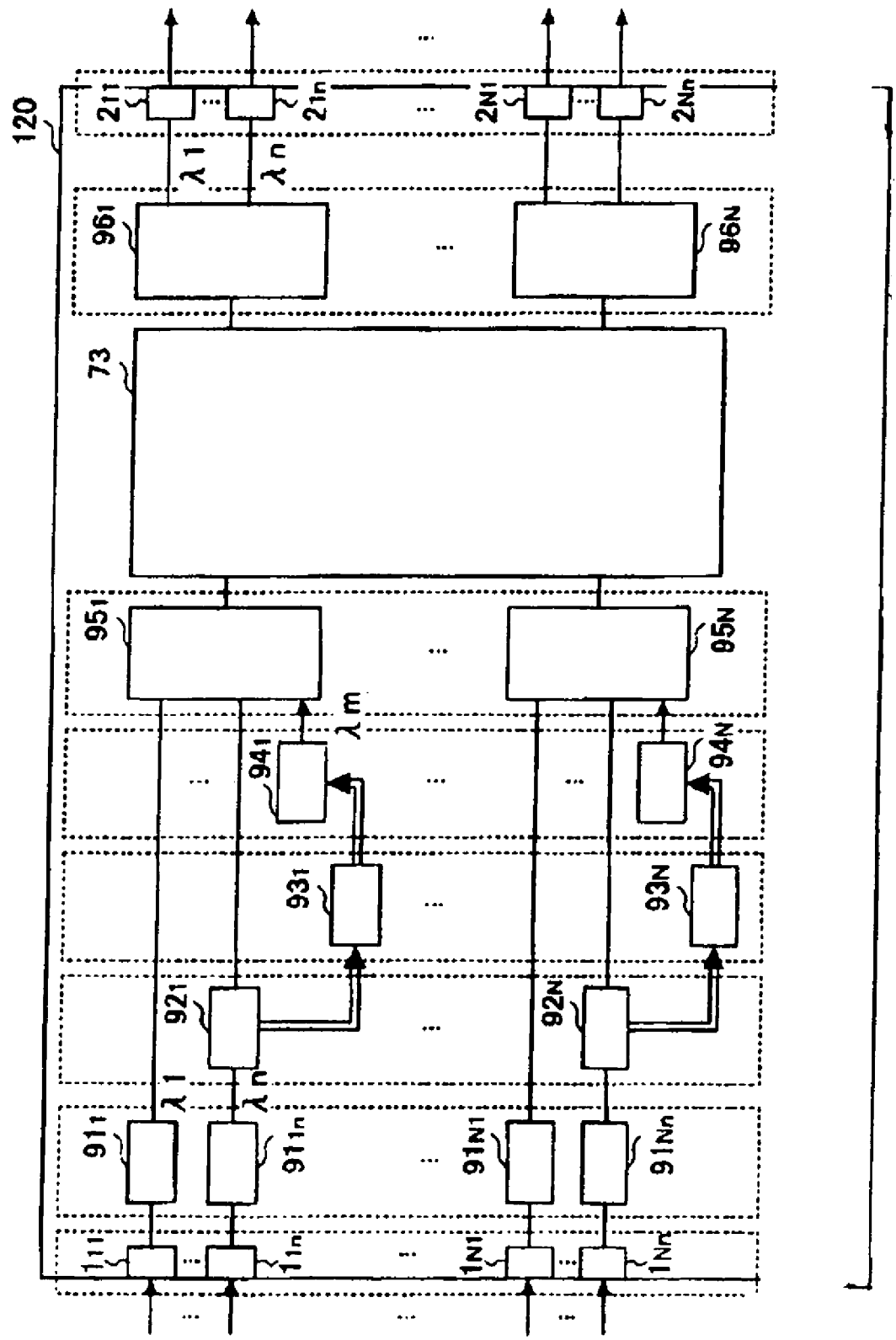
FIG. 13 is a diagram for describing an example of structure of the optical crossconnect device of the twelfth embodiment.

FIG. 13 illustrates an example of the structure of the optical crossconnect device of the twelfth embodiment. The optical crossconnect device 120 of FIG. 13 comprises optical transmission signal input portions $1_{11}$ to $1_{Nn}$, optical transmission output portions $2_{11}$ to $2_{Nn}$, an optical switch portion 73, wavelength converting portion $91_{11}$ to $91_{Nn}$, input signal monitoring portions $92_1$ to $92_N$, monitoring signal controlling portions $93_1$ to $93_N$, monitoring signal generating portions $94_1$ to $94_N$, multiplexers $95_1$ to $95_N$, and demultiplexers $96_1$ to $96_N$.

The optical crossconnect device 120 of the twelfth embodiment provides the wavelength converting portions $91_{11}$ to $91_{Nn}$ between the optical transmission input portions 111 to 1Nn and the multiplexers $95_1$ to $95_N$ in the optical crossconnect device 100 of FIG. 11 of the tenth embodiment.

According to the twelfth embodiment, since the wavelength converting portion 91 is provided between the optical transmission input portion 1 and the multiplexer 95, the effect which is similar to that of the tenth embodiment can be obtained and moreover the limitation on the wavelength of optical signal inputted from the external side can be eliminated.

Figure 14:
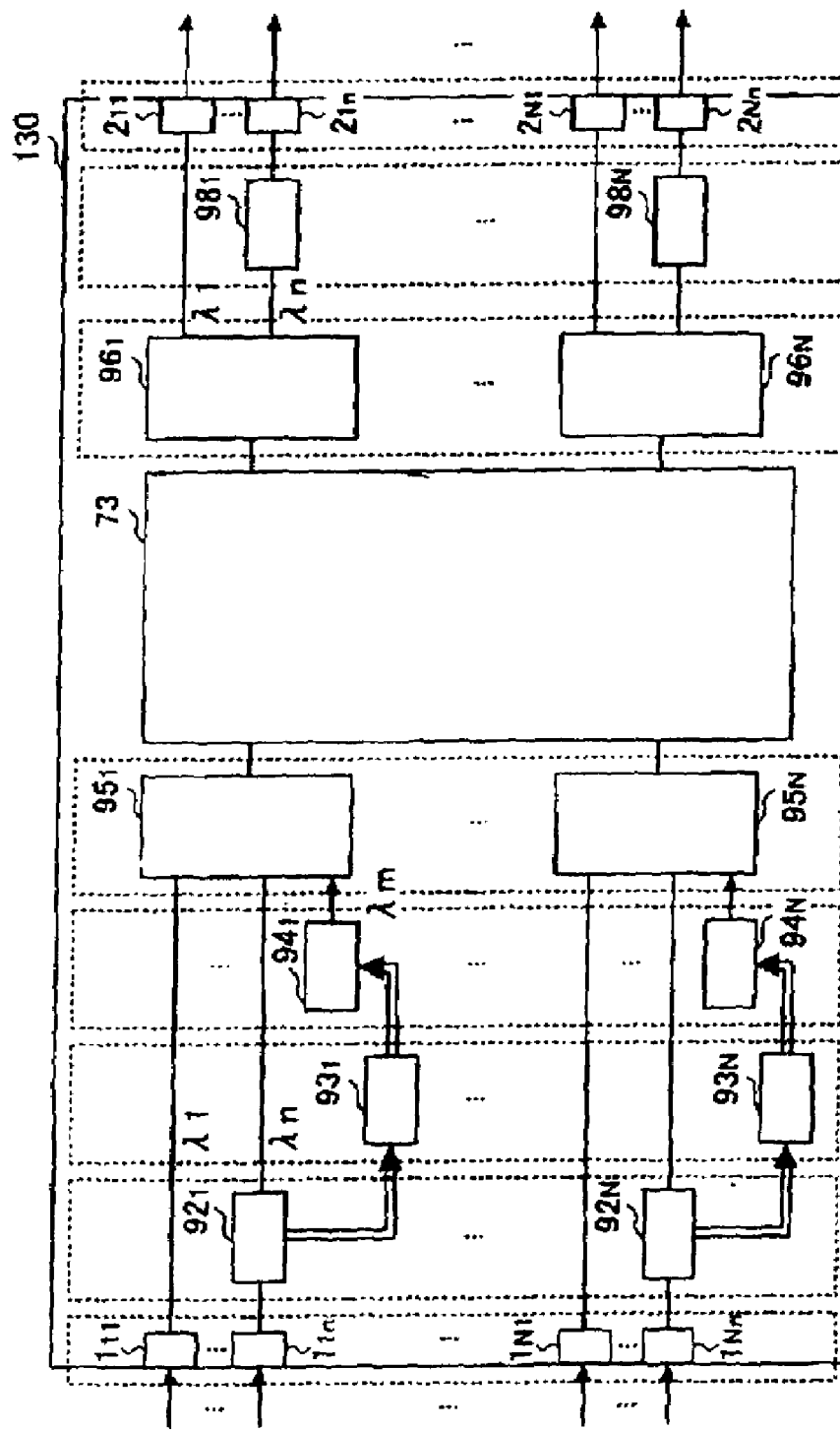
FIG. 14 is a diagram for describing an example of structure of the optical crossconnect device of the thirteenth embodiment.

FIG. 14 illustrates an example of the structure of the optical crossconnect device of the thirteenth embodiment. The optical crossconnect device 130 of FIG. 14 comprises optical transmission signal input portions $1_{11}$ to $1_{Nn}$, optical transmission signal output portions $2_{11}$ to $2_{Nn}$, an optical switch portion 73, input signal monitoring portions $92_1$ to $92_N$, monitoring signal controlling portions $93_1$ to $93_N$, monitoring signal generating portions $94_1$ to $94_N$, multiplexers $95_1$ to $95_N$, multiplexers $96_1$ to $96_N$ and output signal monitoring portions $98_1$ to $98_N$.

The optical crossconnect device 130 of the thirteenth embodiment provides the output signal monitoring portions 981 to 98N for monitoring the optical signal of wavelength λn demultiplexed with the demultiplexers 961 to 96N in the optical crossconnect device 100 of FIG. 11 of the tenth embodiment.

According to the thirteenth embodiment, the output destination selecting portion 24 and output optical signal controlling portion 23 of the fourth embodiment can be eliminated and the monitoring signal generated by the monitoring signal generating portion can always be extracted and monitored by the monitoring signal processing portion without any influence on the optical signal to be outputted to the external side.

Since the optical signal of wavelength λn is always supplied to all input ports of the optical switch portion 73 without relation to the input condition of the optical signal from the external side, when the optical switch portion 73 is normal, an optical level can always be detected without relation to the switching condition of the optical switch portion 73 and failure of all ports of the optical switch portion 73 can always be monitored.

Figure 15:
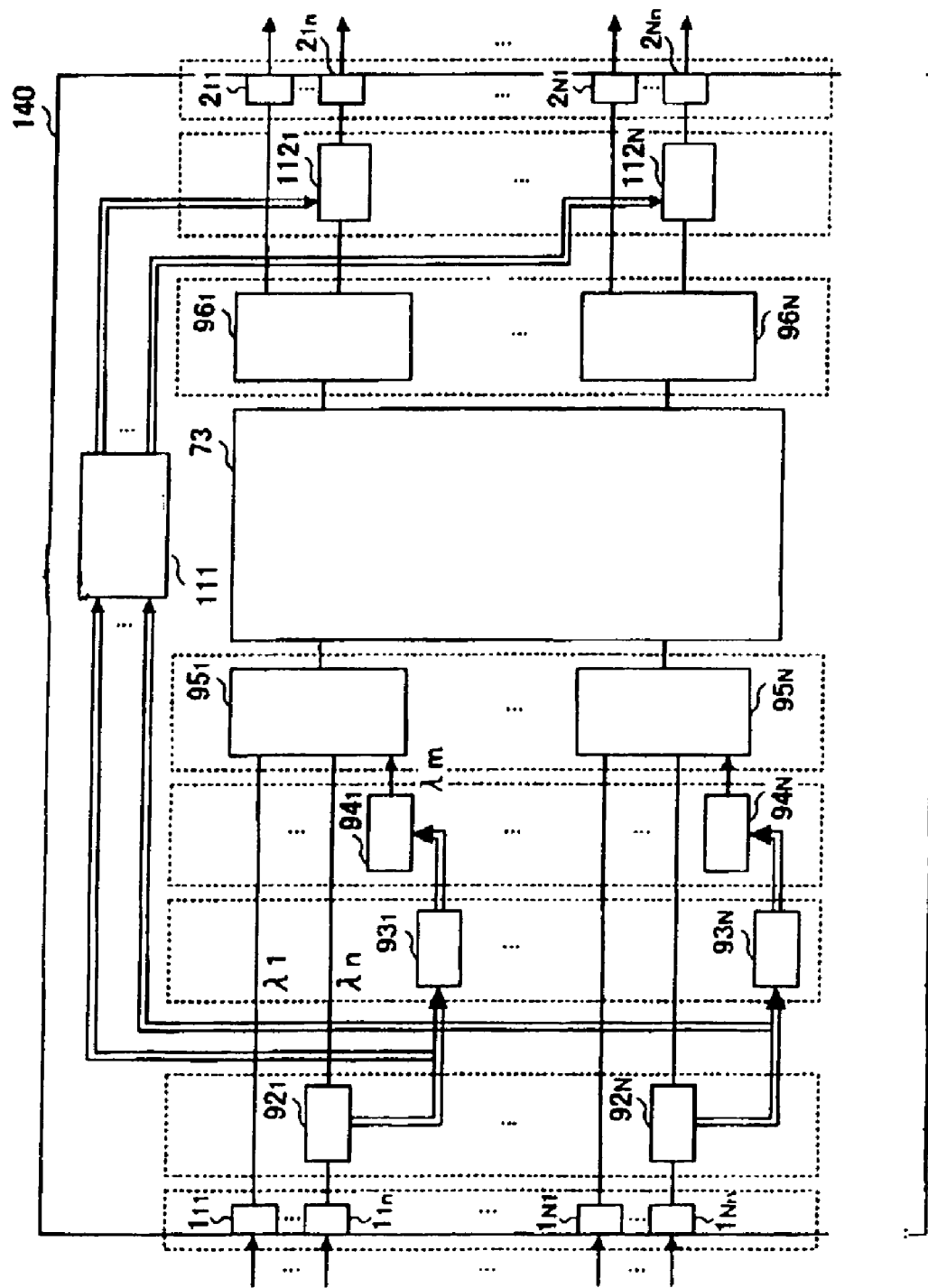
FIG. 15 is a diagram for describing an example of structure of the optical crossconnect device of the fourteenth embodiment.

FIG. 15 illustrates an example of the structure of the optical crossconnect device of the fourteenth embodiment. The optical crossconnect device 140 of FIG. 15 comprises optical transmission signal input portions $1_{11}$ to $1_{Nn}$, optical transmission signal output portions $2_{11}$ to $2_{Nn}$, an optical switch portion 73, input signal monitoring portions $92_1$ to $92_N$, monitoring signal controlling portions $93_1$ to $93_N$, monitoring signal generating portions $94_1$ to $94_N$, multiplexers $95_1$ to $95_N$, demultiplexers $96_1$ to $95_N$, output optical signal controlling portion 111 and output cut-off portions $112_1$ to $112_N$.

The optical crossconnect device 140 of the fourteenth embodiment provides the output cut-off portions $112_1$ to $112_N$ in the preceding stage of the optical output portion 2 of FIG. 12 of the eleventh embodiment and moreover also provides the output optical signal controlling portion 111 for controlling the output cut-off portions $112_1$ to $112_N$.

The output cut-off portion 112 is controlled by the output optical signal controlling portion 111 as the circuit for cutting off the input signal. As the output cut-off portion 112, for example, the output cut-off portion 22 of FIG. 4 may be used.

The output optical signal controlling portion 111 receives a signal depending on the optical level of optical signal from the input signal monitoring portion 92 and controls the output cut-off portion 112. When an optical level of optical signal from the input signal monitoring portion 9.2 is the predetermined level or more, the output optical signal controlling portion 111 controls the output cut-off portion 112 to supply the optical signal of wavelength λn demultiplexed by the demultiplexers $96_1$ to $96_N$ to the optical transmission signal output portion 2. Therefore, the optical transmission signal output portion 2 allows the external input optical signal when the signal level of the external input optical signal of wavelength λn in the input signal monitoring portion 92 satisfies the predetermined constant level.

When the optical level of optical signal from the input signal monitoring portion 92 is the predetermined level or less, the optical signal of wavelength λn demultiplexed by the demultiplexers 961 to 96N is cut off and therefore the output cut-off portion 112 is controlled not to supply the monitoring signal of wavelength λn to the optical transmission signal output portion 2.

Since the output optical signal controlling portion 111 holds the connection information of the input ports and output ports of the optical switch portion 73 and moreover receives the signal depending on the optical level of the optical signal from the input signal monitoring portion 92, it can detect the input port to which the monitoring signal generated by the monitoring signal generating portion 94 is impressed and the output port from which the monitoring signal is outputted. Therefore, the output optical signal controlling portion 111 can control the output cut-off portion 112 to cut off only the monitoring signal from the output port from which the monitoring signal is outputted.

According to the fourteenth embodiment, it is possible to control the operation so that the monitoring signal generated by the monitoring signal generating portion 94 is not transmitted to the external side.

Figure 16:
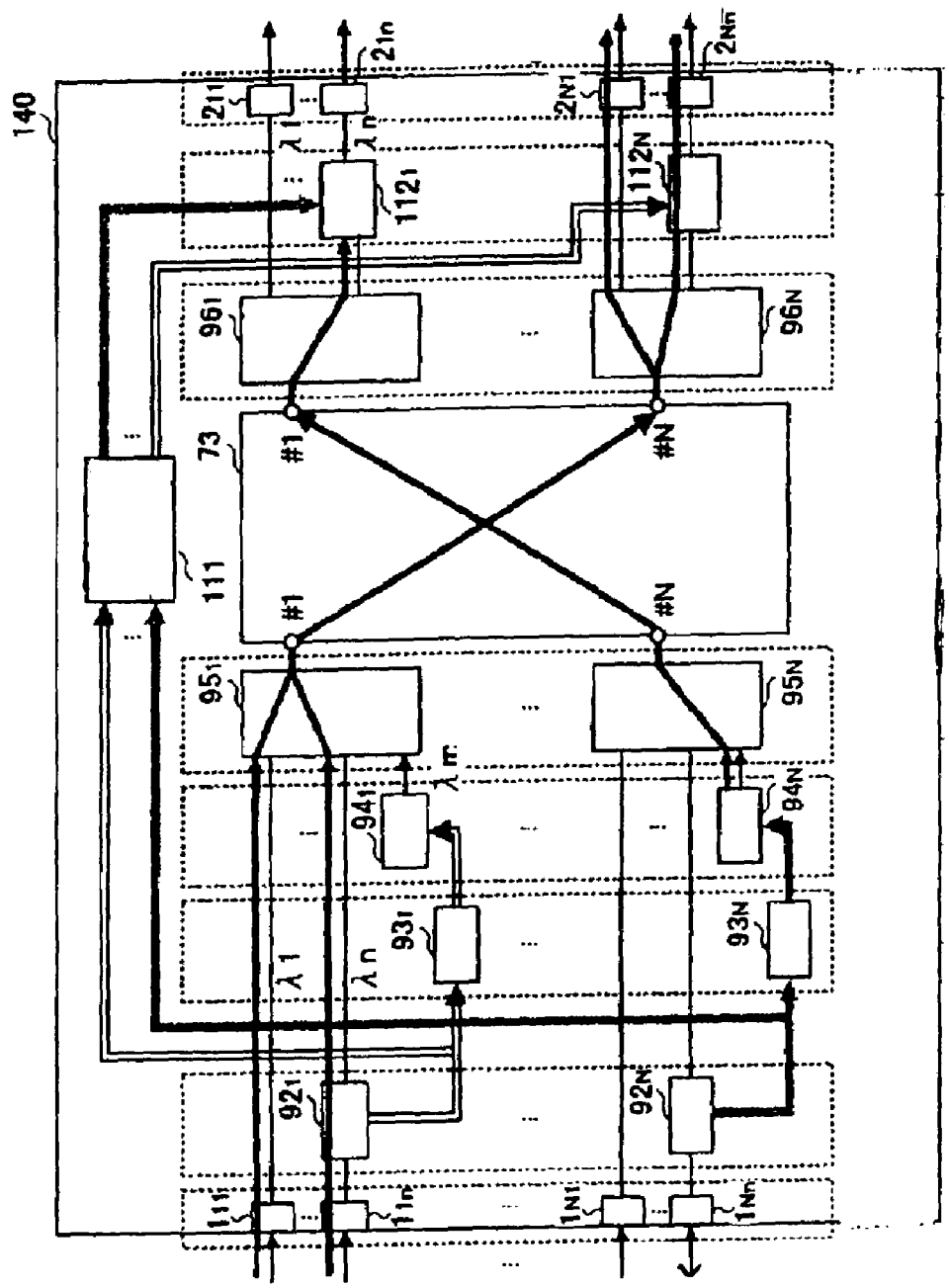
FIG. 16 is a diagram for describing an example of operation of the optical crossconnect device of the fourteenth embodiment.

Operation examples of the optical crossconnect device of the fourteenth embodiment are illustrated in FIG. 16. First, an optical signal #1-1 is inputted to the optical transmission signal input portion $1_{11}$ from the external side, an optical signal #1-n is inputted to the optical transmission signal input portion $1_{1n}$, an optical signal #N-1 is inputted to the optical transmission signal input portion $1_{N1}$, and an optical signal #N-n is inputted to the optical transmission signal input portion $1_{Nn}$. It is also assumed that the optical signals of the input ports #1 and #N are respectively switched by the optical switch portion 73 to the output ports #N and #1 and are then outputted to the external side. As a result, the optical signal #N-1 is outputted to the optical transmission signal output portion $2_{11}$, the optical signal #N-n is outputted to the optical transmission signal output portion $2_{1n}$, the optical signal #1-1 is outputted to the optical transmission signal output portion $2_{N1}$ and the optical signal #1-n is outputted to the optical transmission signal output portion $2_{Nn}$.

Here, if the optical signal #N-n of wavelength λn becomes OFF due to a failure, it is detected with the input signal monitoring portion $92_N$. Based on this detecting information, the monitoring signal controlling portion $93_N$ controls the monitoring signal generating portion $94_N$ to generate the monitoring signal of wavelength λn. Thereby, the monitoring signal of wavelength λn is transmitted, in place of the optical signal #N-n, to the input port #N of the optical switch portion 3 via the multiplexer $95_N$. Moreover, the output optical signal controlling portion 111 simultaneously knows occurrence of fault in the optical signal #N-n. The output optical signal controlling portion 111 controls the output cut-off portion $112_1$ corresponding to the output port #1 to cut off the monitoring signal of wavelength λn because it knows that the output port corresponding to the optical signal #N-n is #1.

When an optical signal is not inputted, from the external side, to the particular optical transmission signal input portion from the beginning, the similar operations are performed. Since a monitoring signal is inserted in place of the optical signal of the particular optical transmission signal input portion to which the optical signal is not inputted to the external side, the optical signal is inputted to all input ports of the optical switch portion 3. Accordingly, the operations for all input ports of the optical switch portion 3 can be verified. Moreover, the inserted monitoring signal is controlled, by the output optical signal control portion 111, so that it is not transmitted to the external side.

Moreover, when the failure of the optical signal #N-n is recovered, the normal optical signal is detected with the monitoring portion $92_N$. Based on this detection information, the input optical signal controlling portion 111 controls the monitoring signal generating portion $94_N$ to stop generation of the monitoring signal by the monitoring signal generating portion $94_N$. Thereby, the optical signal #N-n inputted to the optical transmission signal input portion $1_{Nn}$ is transmitted to the optical switch portion 3. Simultaneously, the output optical signal controlling portion 111 knows recovery of failure of the optical signal #N-n and controls the output cut-off portion $112_1$ at the output port #1 of the optical signal #N-n to output the optical signal #N-n to the optical transmission signal output portion $2_{1n}$.

Figure 17:
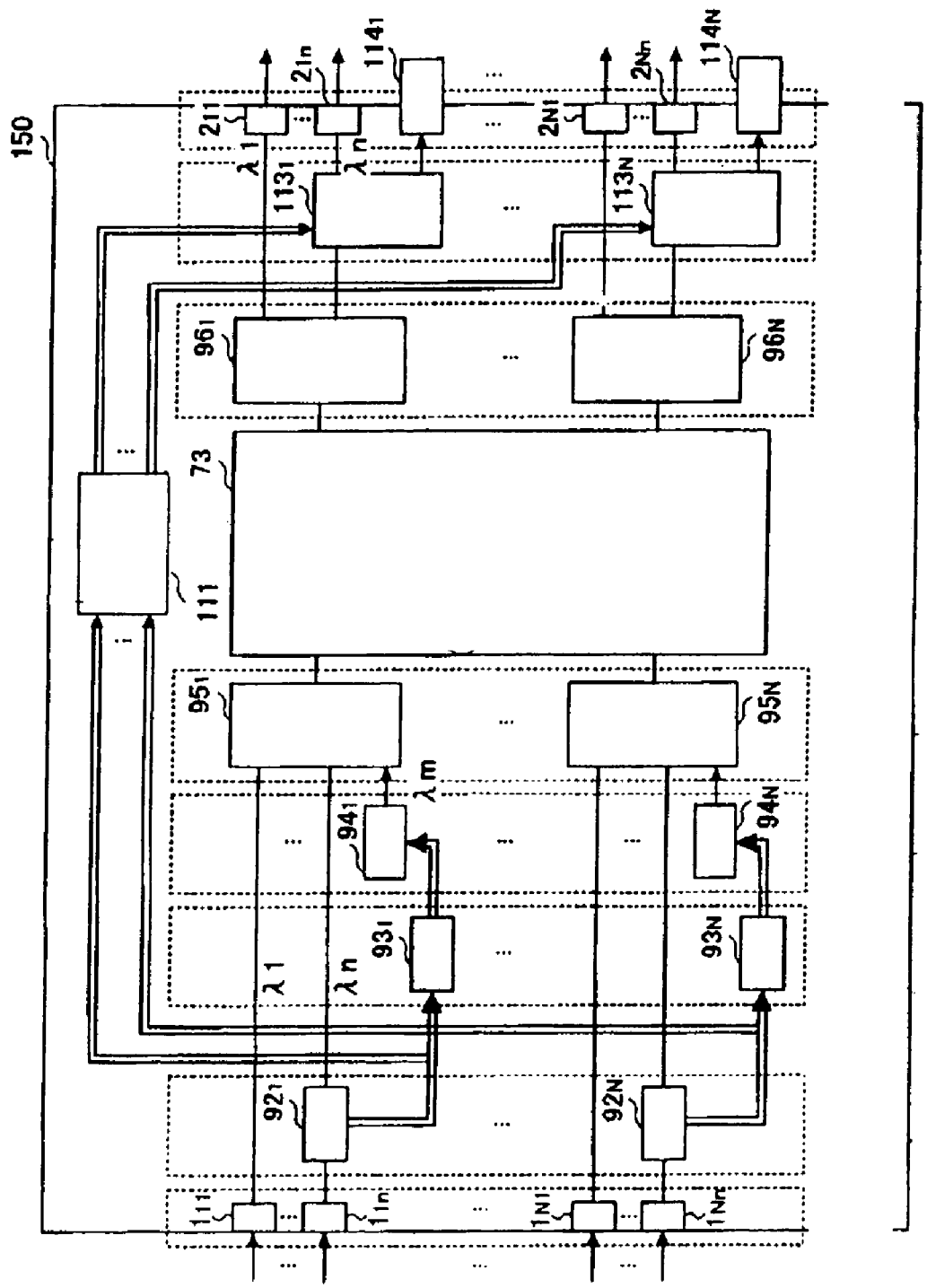
FIG. 17 is a diagram for describing an example of structure of the optical crossconnect device of the fifteenth embodiment.

FIG. 17 illustrates an example of the structure of the optical crossconnect device of the fifteenth embodiment. The optical crossconnect device 150 of FIG. 15 comprises optical transmission signal input portions $1_{11}$ to $1_{Nn}$, optical transmission signal output portions $2_{11}$ to $2_{Nn}$, an optical switch portion 73, input signal monitoring portions $92_1$ to $92_N$, monitoring signal controlling portions $93_1$ to $93_N$, monitoring signal generating portions $94_1$ to $94_N$, multiplexers $95_1$ to $95_N$, demultiplexers $96_1$ to $96_N$, output optical signal controlling portion 111, output destination selecting portions $113_1$ to $113_N$ and monitoring signal processing portions $114_1$ to $114_N$.

In the fifteenth embodiment, the output cut-off portion 112 of the fourteenth embodiment is used as the output destination selecting means having two or more output terminals for only one input terminal as in the case of FIG. 5.

According to the fifteenth embodiment, not only the monitoring signal generated by the monitoring signal generating portion 94 is cut off for the external side but also the monitoring signal is extracted and monitored for effective use of the monitoring signal. Moreover, When the monitoring signal modulated with the particular signal (for example, test signal pattern) is used in place of the frequency signal, various optical switches having higher accuracy can be monitored.

Figure 18:
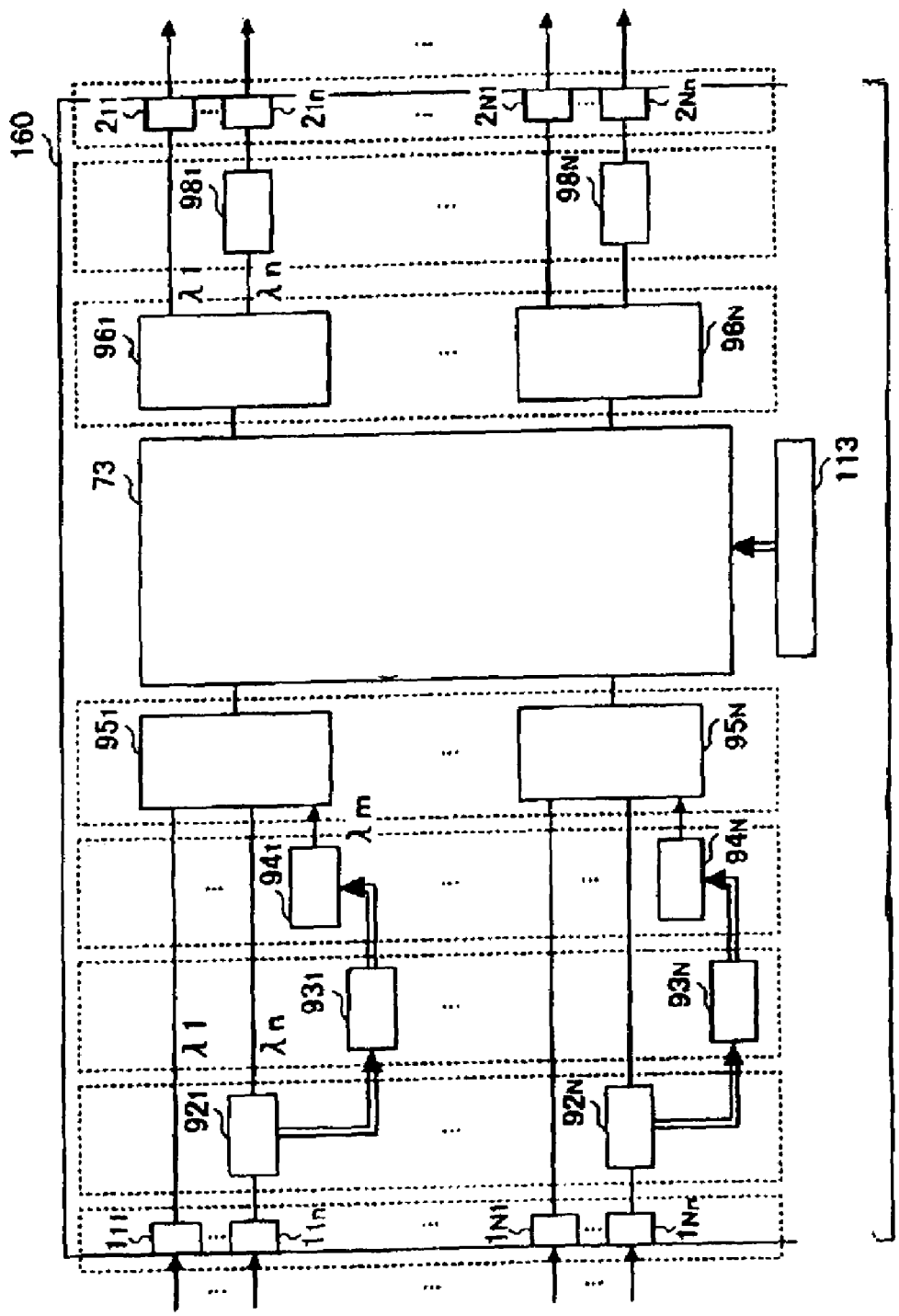
FIG. 18 is a diagram for describing an example of structure of the optical crossconnect device of the sixteenth embodiment.

FIG. 18 illustrates an example of the structure of the optical crossconnect device of the sixteenth embodiment. The optical crossconnect device 160 of FIG. 18 comprises optical transmission signal input portions $1_{11}$ to $1_{Nn}$, optical transmission signal output portions $2_{11}$ to $2_{Nn}$, an optical switch portion 73, input signal monitoring portions $92_1$ to $92_N$, monitoring signal controlling portions $93_1$ to $93_N$, monitoring signal generating portions $94_1$ to $94_N$, multiplexers $95_1$ to $95_N$, demultiplexers $96_1$ to $96_N$, output signal monitoring portions $98_1$ to $98_N$, and optical switch controlling portion 113.

The optical crossconnect device 160 of the sixteenth embodiment has the structure where the optical switch control portion 113 is added to the optical crossconnect device 130 of FIG. 14 of the thirteenth embodiment.

The optical switch control portion 113 connects connection between the non-used input ports and non-used output ports of the optical switch portion 73.

For example, the switching operation among the non-used ports of the optical switch portion 73 can be verified by periodically switching the switching conditions among the non-used ports with the optical switch controlling portion 123. Moreover, the normal operation of the function of the optical switch portion 73 can be verified by connecting, with the optical switch controlling portion 113, the input ports and output ports to be used by a user immediately before the user utilizes these input ports and output ports.

According to the sixteenth embodiment, potential failure of the optical switch portion 73 can be prevented and it is also possible to prevent occurrence of the phenomenon that a failure of the optical switch portion 73 is detected initially when a user inputs an optical signal to the device.

According to the present invention, normal operation of the optical switch circuit can be verified and the optimized operation thereof can always be realized without relation to the input condition of the optical input from the external side and moreover potential failure of the optical switch can also be prevented.

Moreover, the optical crossconnect device of FIG. 2 to FIG. 18 supplies, to the optical switch circuit, the monitoring signal for monitoring the optical switch circuit in unit of wavelength, wavelength group or optical fiber when the optical level of optical signal in unit of wavelength, wavelength group or optical fiber supplied to the optical transmission input signal portion is the predetermined level or less. Accordingly, when the optical crossconnect device of FIG. 2 to FIG. 18 is considered from the different viewpoint, these figures describe a method of monitoring the optical crossconnect device including the optical switch circuit, and more specifically the method of monitoring the optical crossconnect device which can supply, to the optical switch circuit, the monitoring signal for monitoring the optical switch circuit in unit of wavelength, wavelength group or optical fiber when the optical level of, the optical signal in unit of wavelength, wavelength group or optical fiber supplied to the optical transmission signal input portion of the optical crossconnect device is the predetermined level or less.

According to the present invention described above, operations of the optical switch forming the optical crossconnect device can always be verified and thereby the optical crossconnect device of higher stability and reliability and the method of monitoring the optical crossconnect device can be provided.

What is claimed is:

1. An optical crossconnect device comprising:
an optical switch circuit, and
a supplying means for supplying a signal of monitoring the optical switch circuit to the optical switch circuit in unit of wavelength, wavelength group or optical fiber if an optical level of the optical signal in unit of wavelength, wavelength group or optical fiber supplied to an optical transmission signal input portion of the optical crossconnect device is the predetermined level or less, wherein if said optical level is more than the predetermined level, said supplying means supply the optical signal supplied to the optical transmission signal input portion instead of said signal of monitoring the optical switch circuit.

2. An optical crossconnect device comprising:
an optical switch circuit,
an input optical level monitoring means for monitoring an optical level of an optical signal supplied an optical transmission signal to input portion of the optical crossconnect device,
a monitoring signal generating means for generating a monitoring signal for monitoring the optical switch circuit,
an input optical signal selecting means for providing between the optical transmission signal input portion and the optical switch circuit, to select the monitoring signal generated by the monitoring signal generating means or the optical signal supplied to the optical transmission signal input portion in order to supply the selected signal to the optical switch circuit, and
an input optical signal controlling means for controlling the input optical signal selecting means based on an output of the input optical level monitoring means.

3. An optical crossconnect device as recited in claim 2, wherein the optical switch circuit is monitored based on an output of the output optical level monitoring means.

4. An optical crossconnect device as recited in claim 3, further comprising:
an output cut-off means for cutting off the monitoring signal provided between the optical switch circuit and the optical transmission signal output portion of the optical crossconnect device, and
an output optical signal controlling means for controlling the output cut-off means based on an output of the input optical level monitoring means.

5. An optical crossconnect device as recited in claim 4, wherein the output cut-off means includes an output destination selecting means provided with two or more output terminals for one input terminal.

6. An optical crossconnect device as recited in claim 3, wherein an optical switch controlling means for controlling connection between non-used input ports and non-used output ports of the optical switch circuit.

7. A monitoring method of the optical crossconnect device including an optical switch circuit comprising, supplying a monitoring signal for monitoring the optical switch circuit to the optical switch circuit in unit of wavelength, wavelength group or optical fiber when an optical level of the optical signal in unit of wavelength, wavelength group or optical fiber supplied to the optical transmission signal input portion of the optical crossconnect device is the predetermined level or less.

* * * * *